(12) United States Patent (10) Patent No.: US 6,607,647 B2
Wilkins et al. (45) Date of Patent: Aug. 19, 2003

(54) ELECTRODEIONIZATION APPARATUS WITH EXPANDED CONDUCTIVE MESH ELECTRODE AND METHOD

(75) Inventors: Frederick C. Wilkins, Pepperell, MA (US); Li-Shiang Liang, Harvard, MA (US); Anthony Giuffrida, N. Andover, MA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/842,414

(22) Filed: Apr. 25, 2001

(65) Prior Publication Data

US 2003/0079992 A1 May 1, 2003

(51) Int. Cl.[7] .................... C02F 1/469; C25B 13/00; C25B 9/00

(52) U.S. Cl. .............. 204/523; 204/252; 204/282; 204/635; 204/636; 204/639; 204/524

(58) Field of Search .................. 204/633, 635, 204/636, 639, 252, 282, 52, 523, 524, 283, 284

(56) References Cited

U.S. PATENT DOCUMENTS

| | | | | |
|---|---|---|---|---|
| 2,514,415 A | 7/1950 | Rasch | .......................... | 136/26 |
| 2,681,319 A | 6/1954 | Bodamer | ..................... | 136/2.1 |
| 2,681,320 A | 6/1954 | Bodamer | ..................... | 260/2.2 |
| 2,788,319 A | 4/1957 | Pearson | ....................... | 204/151 |
| 2,794,777 A | 6/1957 | Pearson | ....................... | 204/151 |
| 2,815,320 A | 12/1957 | Kollsman | .................... | 204/180 |
| 2,854,394 A | 9/1958 | Kollsman | .................... | 204/180 |
| 2,923,674 A | 2/1960 | Kressman | .................... | 204/180 |
| 2,943,989 A | 7/1960 | Kollsman | .................... | 204/301 |

(List continued on next page.)

FOREIGN PATENT DOCUMENTS

| | | |
|---|---|---|
| AU | B-18629/92 | 10/1992 |
| CA | 2316012 A1 | 11/2001 |
| CN | 1044411 A | 8/1990 |

(List continued on next page.)

OTHER PUBLICATIONS

Warshawsky et al., "Thermally Regenerable Polymerable Polymeric Crown Ethers, II Synthesis and Application in Electrodialysis," pp. 579–584, publication and date unknown.

Wood, Jonathan et al., "Hot Water Sanitization of Continuous Electrodeionization Systems," *Pharmaceutical Engineering*, vol. 20, No. 6, Nov./Dec. 2000, pp. 1–15.

International Application No. PCT/US 01/30053, International Search Report dated Nov. 6, 2002.

(List continued on next page.)

*Primary Examiner*—Patrick Ryan
*Assistant Examiner*—Thomas H Parsons
(74) *Attorney, Agent, or Firm*—Wolf, Greenfield & Sacks, P.C.

(57) ABSTRACT

An electrodeionization apparatus and method of use includes an expanded conductive mesh electrode. The expanded conductive mesh electrode may be formed from any conductive material that is dimensionally stable and may be coated with conductive coating. The expanded conductive mesh electrodes typically have a diamond-shaped pattern of any size that provides support for an adjacent ion-permeable membrane while allowing an electrode or fluid stream to flow through. The conductive mesh electrode may also be placed against an endblock having fluid channels. These channels may be serpentine or parallel channels, which allow fluid flow to wash away any accumulation. The electrodeionization apparatus may have a protective ion-permeable membrane adjacent the electrode. The electrodeionization apparatus may also have a spacer, such as a fabric, a screen or a mesh, positioned adjacent the electrode.

182 Claims, 3 Drawing Sheets

U.S. PATENT DOCUMENTS

| | | | |
|---|---|---|---|
| 3,014,855 A | 12/1961 | Kressman | 204/180 |
| 3,074,864 A | 1/1963 | Gaysowski | 204/151 |
| 3,099,615 A | 7/1963 | Kollsman | 204/180 |
| 3,148,687 A | 9/1964 | Dosch | 134/58 |
| 3,149,061 A | 9/1964 | Parsi | 204/180 |
| 3,149,062 A | 9/1964 | Gottschal et al. | 204/301 |
| 3,165,460 A | 1/1965 | Zang et al. | 204/301 |
| 3,291,713 A | 12/1966 | Parsi | 204/180 |
| 3,330,750 A | 7/1967 | McRae et al. | 204/180 |
| 3,341,441 A | 9/1967 | Giuffrida et al. | 204/180 |
| 3,375,208 A | 3/1968 | Duddy | 260/2.1 |
| 3,627,703 A | 12/1971 | Kojima et al. | 260/2.1 E |
| 3,645,884 A | 2/1972 | Gilliland | 204/301 |
| 3,686,089 A | 8/1972 | Korngold | 204/180 F |
| 3,755,135 A | 8/1973 | Johnson | 204/301 |
| 3,869,376 A | 3/1975 | Tejeda | 204/301 |
| 3,870,033 A | 3/1975 | Faylor et al. | 126/360 R |
| 3,876,565 A | 4/1975 | Takashima et al. | 260/2.1 R |
| 3,989,615 A | 11/1976 | Kiga et al. | 204/252 |
| 4,032,452 A | 6/1977 | Davis | 210/243 |
| 4,033,850 A | 7/1977 | Kedem et al. | 204/301 |
| 4,089,758 A | 5/1978 | McAloon | 204/98 |
| 4,116,889 A | 9/1978 | Chlanda et al. | 521/27 |
| 4,119,581 A | 10/1978 | Rembaum et al. | 521/27 |
| 4,130,473 A | 12/1978 | Eddleman | 204/252 |
| 4,153,761 A | 5/1979 | Marsh | 521/26 |
| 4,167,551 A | 9/1979 | Tamura et al. | 521/27 |
| 4,191,811 A | 3/1980 | Hodgdon | 521/27 |
| 4,197,206 A | 4/1980 | Karn | 210/321 |
| 4,216,073 A | 8/1980 | Goldstein | 204/296 |
| 4,217,200 A | 8/1980 | Kedem et al. | 204/301 |
| 4,226,688 A | 10/1980 | Kedem et al. | 204/180 P |
| 4,228,000 A | 10/1980 | Hoeschler | 210/673 |
| 4,294,933 A | 10/1981 | Kihara et al. | 521/27 |
| 4,298,442 A | 11/1981 | Giuffrida | 204/180 P |
| 4,321,145 A | 3/1982 | Carlson | 210/678 |
| 4,330,654 A | 5/1982 | Ezzell et al. | 526/243 |
| 4,358,545 A | 11/1982 | Ezzell et al. | 521/27 |
| 4,374,232 A | 2/1983 | Davis | 525/243 |
| 4,430,226 A | 2/1984 | Hegde et al. | 210/638 |
| 4,465,573 A | 8/1984 | O'Hare | 204/180 P |
| 4,473,450 A | 9/1984 | Nayak et al. | 204/147 |
| 4,505,797 A | 3/1985 | Hodgdon et al. | 204/252 |
| 4,574,049 A | 3/1986 | Pittner | 210/639 |
| 4,614,576 A | 9/1986 | Goldstein | 204/299 R |
| 4,632,745 A | 12/1986 | Giuffrida et al. | 204/301 |
| 4,636,296 A | 1/1987 | Kunz | 204/182.5 |
| 4,661,411 A | 4/1987 | Martin et al. | 428/421 |
| 4,671,863 A | 6/1987 | Tejeda | 204/266 |
| 4,687,561 A | 8/1987 | Kunz | 204/182.5 |
| 4,702,810 A | 10/1987 | Kunz | 204/182.4 |
| 4,707,240 A | 11/1987 | Parsi et al. | 204/290 F |
| 4,747,929 A | 5/1988 | Siu et al. | 204/301 |
| 4,747,955 A | 5/1988 | Kunin | 210/679 |
| 4,751,153 A | 6/1988 | Roth | |
| 4,753,681 A | 6/1988 | Giuffrida et al. | 134/22.17 |
| 4,770,793 A | 9/1988 | Treffry-Goatley et al. | 210/769 |
| 4,804,451 A | 2/1989 | Palmer | 204/301 |
| 4,849,102 A | 7/1989 | Latour et al. | 210/321.64 |
| 4,871,431 A | 10/1989 | Parsi | 204/182.4 |
| 4,872,958 A | 10/1989 | Suzuki et al. | 204/98 |
| 4,925,541 A | 5/1990 | Giuffrida et al. | 204/182.5 |
| 4,931,160 A | 6/1990 | Giuffrida | 204/301 |
| 4,956,071 A | 9/1990 | Giuffrida et al. | 204/301 |
| 4,964,970 A | 10/1990 | O'Hare | 204/301 |
| 4,969,983 A | 11/1990 | Parsi | 204/182.4 |
| 4,983,267 A | 1/1991 | Moeglich et al. | 204/182.4 |
| 5,026,465 A | 6/1991 | Katz et al. | 204/182.4 |
| 5,030,672 A | 7/1991 | Hann et al. | 524/109 |
| 5,066,375 A | 11/1991 | Parsi et al. | 204/182.4 |
| 5,066,402 A | 11/1991 | Anselme et al. | 210/636 |
| 5,073,268 A | 12/1991 | Saito et al. | 210/638 |
| 5,082,472 A | 1/1992 | Mallouk et al. | 55/16 |
| 5,084,148 A | 1/1992 | Kazcur et al. | 204/95 |
| 5,092,970 A | 3/1992 | Kaczur et al. | 204/98 |
| 5,106,465 A | 4/1992 | Kaczur et al. | 204/98 |
| 5,116,509 A | 5/1992 | White | 210/644 |
| 5,120,416 A | 6/1992 | Parsi et al. | 204/182.4 |
| 5,126,026 A | 6/1992 | Chlanda | 204/182.4 |
| 5,128,043 A | 7/1992 | Wildermuth | 210/695 |
| 5,154,809 A | 10/1992 | Oren et al. | 204/182.4 |
| 5,166,220 A | 11/1992 | McMahon | 521/26 |
| 5,176,828 A | 1/1993 | Proulx | 210/341 |
| 5,196,115 A | 3/1993 | Andelman | 210/198.2 |
| 5,203,976 A | 4/1993 | Parsi et al. | 204/182.4 |
| 5,211,823 A | 5/1993 | Giuffrida et al. | 204/182.4 |
| 5,223,103 A | 6/1993 | Kazcur et al. | 204/95 |
| 5,240,579 A | 8/1993 | Kedem | 204/182.4 |
| 5,254,227 A | 10/1993 | Cawlfield et al. | 204/131 |
| 5,259,936 A | 11/1993 | Ganzi | 204/131 |
| 5,292,422 A | 3/1994 | Liang et al. | 204/301 |
| 5,308,466 A | 5/1994 | Ganzi et al. | 204/151 |
| 5,308,467 A | 5/1994 | Sugo et al. | 204/301 |
| 5,316,637 A | 5/1994 | Ganzi et al. | 204/182.4 |
| 5,346,624 A | 9/1994 | Libutti et al. | 210/679 |
| 5,346,924 A | 9/1994 | Giuffrida | 521/28 |
| 5,356,849 A | 10/1994 | Matviya et al. | 502/180 |
| 5,358,640 A | 10/1994 | Zeiher et al. | 210/639 |
| 5,376,253 A | 12/1994 | Rychen et al. | 204/301 |
| 5,411,641 A | 5/1995 | Trainham, III et al. | 204/59 R |
| 5,425,858 A | 6/1995 | Farmer | 204/149 |
| 5,425,866 A | 6/1995 | Sugo et al. | 204/301 |
| 5,434,020 A | 7/1995 | Cooper | 429/210 |
| 5,444,031 A | 8/1995 | Hayden | 502/180 |
| 5,451,309 A | 9/1995 | Bell | 204/301 |
| 5,458,787 A | 10/1995 | Rosin et al. | 210/719 |
| 5,460,725 A | 10/1995 | Stringfield | 210/690 |
| 5,460,728 A | 10/1995 | Klomp et al. | 210/698 |
| 5,489,370 A | 2/1996 | Lomasney et al. | 204/627 |
| 5,503,729 A | 4/1996 | Elyanow et al. | 204/630 |
| 5,518,626 A | 5/1996 | Birbara et al. | 210/670 |
| 5,518,627 A | 5/1996 | Tomoi et al. | 210/682 |
| 5,536,387 A | 7/1996 | Hill et al. | 205/494 |
| 5,538,611 A | 7/1996 | Otowa | 204/550 |
| 5,538,655 A | 7/1996 | Fauteux et al. | 252/162.2 |
| 5,539,002 A | 7/1996 | Watanabe | 521/27 |
| 5,547,551 A | 8/1996 | Bahar et al. | 204/296 |
| 5,558,753 A | 9/1996 | Gallagher et al. | 204/632 |
| 5,580,437 A | 12/1996 | Trainham, III et al. | 205/631 |
| 5,584,981 A | 12/1996 | Turner et al. | 204/536 |
| 5,593,563 A | 1/1997 | Denoncourt et al. | 204/524 |
| 5,599,614 A | 2/1997 | Bahar et al. | 442/171 |
| 5,670,053 A | 9/1997 | Collentro et al. | 210/652 |
| 5,679,228 A | 10/1997 | Elyanow et al. | 204/524 |
| 5,679,229 A | 10/1997 | Goldstein et al. | 204/524 |
| 5,714,521 A | 2/1998 | Kedem et al. | 521/27 |
| RE35,741 E | 3/1998 | Oren et al. | 204/524 |
| 5,736,023 A | 4/1998 | Gallagher et al. | 204/524 |
| 5,759,373 A | 6/1998 | Terada et al. | 204/524 |
| 5,762,774 A | 6/1998 | Tessier | 204/524 |
| 5,766,479 A | 6/1998 | Collentro et al. | 210/639 |
| 5,804,055 A | 9/1998 | Coin et al. | 205/334 |
| 5,814,197 A | 9/1998 | Batchelder et al. | 204/524 |
| 5,837,124 A | 11/1998 | Su et al. | 205/746 |
| 5,858,191 A | 1/1999 | DiMascio et al. | 204/524 |
| 5,868,915 A | 2/1999 | Ganzi et al. | 204/524 |
| 5,891,328 A | 4/1999 | Goldstein | 210/321.6 |
| 5,925,240 A | 7/1999 | Wilkins et al. | 210/88 |
| 5,954,935 A | 9/1999 | Neumeister et al. | 204/632 |
| 5,961,805 A | 10/1999 | Terada et al. | 204/632 |
| 5,980,716 A | 11/1999 | Horinouchi et al. | 204/524 |

| | | | |
|---|---|---|---|
| 6,056,878 A | 5/2000 | Tessier et al. | 210/639 |
| 6,099,716 A | 8/2000 | Molter et al. | 205/687 |
| 6,149,788 A | 11/2000 | Tessier et al. | 204/524 |
| 6,187,162 B1 | 2/2001 | Mir | 204/524 |
| 6,190,528 B1 | 2/2001 | Li et al. | 204/632 |
| 6,190,558 B1 | 2/2001 | Robbins | 210/652 |
| 6,193,869 B1 | 2/2001 | Towe et al. | 204/632 |
| 6,197,174 B1 | 3/2001 | Barber et al. | 204/524 |
| 6,214,204 B1 | 4/2001 | Gadkaree et al. | 205/758 |
| 6,228,240 B1 | 5/2001 | Terada et al. | 204/632 |
| 6,235,166 B1 | 5/2001 | Towe et al. | 204/263 |
| 6,248,226 B1 | 6/2001 | Shinmei et al. | 204/632 |
| 6,254,741 B1 | 7/2001 | Stuart et al. | 204/254 |
| 6,258,278 B1 | 7/2001 | Tonelli et al. | 210/652 |
| 6,267,891 B1 | 7/2001 | Tonelli et al. | 210/652 |
| 6,284,124 B1 | 9/2001 | DiMascio et al. | 205/753 |
| 6,284,399 B1 | 9/2001 | Oko et al. | 429/19 |
| 6,303,037 B1 | 10/2001 | Tamura et al. | 210/652 |
| 6,471,867 B2 | 10/2002 | Sugaya et al. | 210/644 |
| 2001/0003329 A1 | 6/2001 | Sugaya et al. | 210/641 |

FOREIGN PATENT DOCUMENTS

| | | |
|---|---|---|
| DE | 1 201 055 | 9/1965 |
| DE | 44 18 812 | 12/1995 |
| DE | 199 42 347 | 3/2001 |
| EP | 0 503 589 | 9/1992 |
| EP | 0 621 072 A2 | 10/1994 |
| EP | 0 680 932 | 11/1995 |
| EP | 0 870 533 | 10/1998 |
| EP | 1 068 901 A2 | 1/2001 |
| EP | 1 075 868 A2 | 2/2001 |
| EP | 1 101 790 A1 | 5/2001 |
| EP | 1 106 241 A1 | 6/2001 |
| GB | 776469 | 6/1957 |
| GB | 877239 | 9/1961 |
| GB | 880344 | 10/1961 |
| GB | 893051 A2 | 4/1962 |
| GB | 942762 | 11/1963 |
| GB | 1048026 | 11/1966 |
| GB | 1137679 | 12/1968 |
| GB | 1448533 | 9/1976 |
| JP | 47 49424 | 12/1972 |
| JP | 54-5888 | 1/1979 |
| JP | 5-271015 | 10/1993 |
| JP | 7155750 | 6/1995 |
| JP | 7-265865 | 10/1995 |
| JP | 09253643 | 9/1997 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| WO | WO 92/11089 | 7/1992 |
| WO | WO 95/32052 | 11/1995 |
| WO | WO 95/32791 | 12/1995 |
| WO | WO 96/22162 | 7/1996 |
| WO | WO 97/25147 | 7/1997 |
| WO | WO 97/46491 | 12/1997 |
| WO | WO 97/46492 | 12/1997 |
| WO | WO 98/11987 | 3/1998 |
| WO | WO 98/20972 | 5/1998 |
| WO | WO 99/39810 | 8/1999 |
| WO | WO 00/30749 | 6/2000 |
| WO | WO 00/64325 | 11/2000 |
| WO | WO 00/75082 | 12/2000 |
| WO | WO 01/49397 | 7/2001 |

OTHER PUBLICATIONS

ASTM, "Standard Practice for Calculation and Adjustment of the Langelier Saturation Index for Reverse Osmosis," Designation: D3739–94 (Reapproved 1998), pp. 1–4.

Calay, J.–C. et al., "The Use of EDI to Reduce the Ammonia Concentration in Steam Generators Blowdown of PWR Nuclear Power Plants," *PowerPlant Chemistry*, vol. 2, No. 8, 2000, pp. 467–470. No Month and/or Year Provided.

Dimascio et al., "Continuous Electrodeionization: Production of High–Purity Water without Regeneration Chemicals," The Electrochemical Society *Interface*, Fall 1998, pp. 26–29. No Month and/or Year Provided.

Dimascio et al., "Electrodiaresis Polishing (An Electrochemical Deionization Process)," date unknown, pp. 164–172. No Month and/or Year Provided.

Dow Chemical, "DOWEX MARATHON A Ion Exchange Resin," published Dec. 1999, Product Literature reprinted from www.dow.com.

Dow Chemical, "DOWEX MARATHON A2 Ion Exchange Resin," published Nov. 1998, Product Literature reprinted from www.dow.com.

Dupont Product Information, "NAFION Perfluorinated Membranes," printed Nov. 1993, 4 pages.

Dupont Product Information, "Nafion perfluorinated polymer products," Sep. 1998, 4 pages.

Dupont Product Information, "Nafion perfluorinated membranes," Bulletin 97–01, Jan. 14, 1999, 8 pages.

Farmer et al., Capacitive Deionization of $NH_4ClO_4$ Solutions with Carbon Aerogel Electrodes, *J. Appl. Electro–Chemistry*, vol. 26, (1996), pp. 1007–1008. No Month and/or Year Provided.

FDA, "Guide to Inspections of High Purity Water Systems," printed from www.fda.gov. on Dec. 28, 2001, date unknown. No Month and/or Year Provided.

Ganzi, G.C. et al., "Electrodeionization: Theory and Practice of Continuous Electrodeionization," *Ultrapure Water*, Jul./Aug. 1997, pp. 64–69.

G.J. Gittens et al., "The Application of Electrodialysis to Demineralisation," A.I.Ch.E.–I.Chem.E. Symposium Series No. 9, 1965 (London: Instn chem. Engrs), pp. 79–83. No Month and/or Year Provided.

Glueckauf, "Electro–Deionisation Through a Packed Bed," *British Chemical Engineering*, Dec. 1959, pp. 646–651.

Hobro et al., "Recycling of Chromium from Metal Finishing Waste Waters Using Electrochemical Ion Exchange (EIX)," 1994, pp. 173–183, publication and date unknown, No Month and/or Year Provided.

International Serach Report PCT/US93/08745, dated Dec. 30, 1993.

International Serach Report PCT/US97/17189, dated Jan. 15, 1998.

Interantional Search Report PCT/US97/17190, dated Jan. 15, 1998.

International Search Report PCT/US00/01666, dated Jun. 13, 2000.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510–517.

Kedem et al., "EDS—Sealed Cell Electrodialysis," *Desalination*, vol. 46, 1983, pp. 291–298. No Month and/or Year Provided.

Kedem et al., "Reduction of Polarization by Ion–Conduction Spacers: Theoretical Evaluation of a Model System," *Desalination,* vol. 27, 1978, pp. 143–156. No Month and/or Year Provided.

Korngold, "Electrodialysis Process Using Ion Exchange Resins Between Membranes," *Desalination,* vol. 16, 1975, pp. 225–233.

Matejka, "Continuous Production of High–Purity Water by Electro–Deionisation," *J. Appl. Chem., Biotechnol.,* vol. 21, Apr. 1971, pp. 117–120.

Purolite Technical Bulletin, Hypersol–Macronet™ Sorbent Resins, 1995 No Month and/or Year Provided.

V. Shaposhnik et al., "Demineralization of water by electrodialysis with ion–exchange membranes, grains and nets," *Desalination,* vol. 133, (2001), pp. 211–214. No Month and/or Year Provided.

R. Simons, "Strong Electric Field Effects on Proton Transfer Between Membrane–Bound Amines and Water," *Nature,* vol. 280, Aug. 30, 1979, pp. 824–826. No Month and/or Year Provided.

R. Simons, "Electric Field Effects on Proton Transfer Between Ionizable Groups and Water in Ion Exchange Membrances," *Electrochimical Acta,* vol. 29, No. 2, 1984, pp. 151–158. No Month and/or Year Provided.

R. Simons, "Water Splitting In Ion Exchange Membranes,"0 Pergamon Press Ltd., 1985, pp. 275–282 No Month and/or Year Provided.

R. Simons, "The Origin and Elimination of Water Splitting in Ion Exchange Membranes During Water Demineralisation By Electrodialysis," *Desalination,* vol. 28, Jan. 29, 1979, pp. 41–42.

USFilter, "H–Series Industrial CDI® Systems," product information, 1998, 4 pgs. No Month and/or Year Provided.

Walters et al., "Concentration of Radioactive Aqueous Wastes," *Industrial and Engineering Chemistry,* Jan. 1955, pp. 61–67.-

ELECTRODEIONIZATION APPARATUS WITH EXPANDED CONDUCTIVE MESH ELECTRODE AND METHOD

BACKGROUND OF THE INVENTION

1. Field of the Invention

The present application relates to an electrodeionization apparatus and method and, more particularly, to an electrodeionization apparatus and method incorporating an expanded conductive mesh electrode.

2. Description of Related Art

Electrodeionization (EDI) is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices may include media of permanent or temporary charge and may be operated to cause electrochemical reactions specifically designed to achieve or enhance performance. These devices also include electrically active membranes such as semipermeable ion exchange or bipolar membranes.

Continuous electrodeionization (CEDI) is a process wherein the primary sizing parameter is the transport through the media, not the ionic capacity of the media. A typical CEDI device includes alternating electroactive semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction product from the electrodes can be separated from the other flow compartments. Upon imposition of the electric field, ions in the liquid are attracted to their respective counterelectrodes. The compartments bounded by the electroactive anion permeable membrane facing the anode and the electroactive cation membrane facing the cathode typically become ionically depleted and the compartments bounded by the electroactive cation permeable membrane facing the anode and the electroactive anion membrane facing the cathode typically become ionically concentrated. The volume within the ion-depleting compartments and, in some embodiments, within the ion-concentrating compartments, also includes electrically active media. In CEDI devices, the media may include intimately mixed anion and cation exchange resins. The ion-exchange media typically enhances the transport of ions within the compartments and may participate as a substrate for controlled electrochemical reactions.

SUMMARY OF THE INVENTION

The present invention is directed to an electrodeionization apparatus comprising at least one electrode formed from an expanded conductive mesh in contact with an ion-permeable membrane.

In another embodiment, the present invention is directed to an electrodeionization apparatus comprising an electrode and an ion-permeable membrane comprising a perfluorosulfonic acid and positioned adjacent the electrode.

In another embodiment, the present invention is directed to an electrodeionization apparatus comprising an electrode and an ion-permeable membrane comprising a copolymer of polytetrafluoroethylene and perfluorosulfonic acid and positioned adjacent the electrode.

In another embodiment, the present invention is directed to an electrodeionization apparatus comprising an expanded mesh electrode positioned between at least two spacers.

In another aspect of the present invention, an electrodeionization apparatus is provided comprising at least one electrode formed from an expanded conductive metal mesh wherein a first surface of the electrode is in contact with an ion-permeable membrane and an opposing surface of the electrode is in contact with an endblock.

In another aspect of the invention, an electrodeionization apparatus comprises an ion-depleting compartment, an anolyte compartment comprising an expanded titanium mesh anode in contact with an ion-permeable membrane and a catholyte compartment.

In another aspect of the present invention, an electrodeionization apparatus is provided comprising a plurality of alternating anion and cation permeable membranes that define ion-depleting and ion-concentrating compartments, an anolyte compartment comprising an expanded metal mesh anode in contact with an anion-permeable membrane and a catholyte compartment.

In another aspect of the present invention, an electrodeionization apparatus is provided comprising at least one electrode formed from an expanded metal mesh in contact with an interior surface of an endblock wherein the interior surface comprises flow channels.

In another aspect of the invention, a method of purifying a liquid comprises the steps of providing an electrodeionization apparatus comprising at least one electrode formed from an expanded metal mesh, wherein the electrode is in contact with an ion-permeable membrane, applying an electrical current across the electrodeionization apparatus and passing the liquid through the electrodeionization apparatus.

In another aspect of the invention, a method of purifying a liquid comprises the steps of providing an electrodeionization apparatus comprising at least one electrode formed from an expanded metal mesh, wherein a first surface of the electrode is in contact with an ion-permeable membrane and an opposing surface of the electrode is in contact with an inner surface of an endblock wherein the inner surface comprises flow channels, applying an electrical current across the electrodeionization apparatus and passing the liquid through the electrodeionization apparatus.

In another aspect of the invention, a method of purifying a liquid comprises the steps of providing an electrodeionization apparatus comprising at least one electrode formed from an expanded metal mesh, wherein a first surface of the electrode is in contact with an ion-permeable membrane and an opposing surface of the electrode is in contact with an inner surface of an endblock wherein the inner surface comprises flow channels, applying an electrical current across the electrodeionization apparatus, promoting fluid mixing in a region adjacent the electrode and passing the liquid through the electrodeionization apparatus.

In another aspect of the invention, a method of purifying a liquid comprises the steps of providing an electrodeionization apparatus comprising an ion-depleting compartment, an anolyte compartment and a catholyte compartment, wherein the anolyte compartment comprises an expanded titanium mesh anode in contact with an ion-permeable membrane, applying an electrical current across the electrodeionization apparatus and passing the liquid through the electrodeionization apparatus.

In another aspect of the invention, a method of purifying a liquid comprises providing an electrodeionization apparatus comprising alternating anion and cation permeable membranes defining ion-depleting and ion-concentrating compartments, an anolyte compartment and a catholyte compartment, wherein the anolyte compartment comprises an expanded metal mesh anode, applying an electrical current across the electrodeionization apparatus and passing the liquid through the electrodeionization apparatus.

In another embodiment, the present invention is directed to an electrodeionization apparatus comprising an electrode compartment constructed and arranged to allow purification of a liquid without chemical addition to provide a reduction in electrical resistance across the compartment.

In another embodiment, the present invention is directed to an electrodeionization apparatus comprising an electrode compartment free of ion exchange resin constructed and arranged to allow purification of a liquid without chemical addition to provide a reduction in electrical resistance across the compartment.

In another embodiment, the invention is directed to an electrodeionization apparatus comprising an electrode compartment free of ion exchange resin and constructed and arranged to allow purification of liquid without chemical addition to provide a substantially uniform current density in the compartment.

In another embodiment, a method is provided for purifying a liquid comprising the steps of providing an electrodeionization apparatus comprising an electrode formed from an expanded conductive mesh, wherein the electrode is in contact with an ion-permeable membrane comprising perfluorosulfonic acid, applying an electrical current across the electrodeionization apparatus and passing the liquid through the electrodeionization apparatus.

In another embodiment, a method is provided for purifying a liquid comprising the steps of providing an electrodeionization apparatus comprising an electrode formed from an expanded conductive mesh, wherein a first surface of the electrode is in contact with an ion-permeable membrane comprising a copolymer of perfluorosulfonic acid and polytetrafluoroethylene and an opposing surface of the electrode is in contact with an inner surface of an endblock wherein the inner surface comprises liquid flow channels, applying an electrical current across the electrodeionization apparatus and passing the liquid through the electrodeionization apparatus.

In another aspect of the present invention, an electrodeionization apparatus is provided comprising at least one electrode formed from a perforated plate positioned adjacent to an ion-permeable membrane.

In another aspect of the present invention, an electrodeionization apparatus is provided comprising an electrode positioned adjacent a flow mixer.

In another aspect of the present invention, an electrodeionization apparatus is provided comprising an expanded mesh electrode, a spacer positioned adjacent the mesh electrode and an ion-permeable membrane positioned adjacent the mesh electrode at an opposite side from the spacer.

In another embodiment, the present invention is directed to an electrodeionization apparatus comprising at least one electrode formed from an expanded mesh positioned adjacent to an ion-permeable membrane.

BRIEF DESCRIPTION OF THE DRAWINGS

Preferred, non-limiting embodiments of the present invention will be described by way of example with reference to the accompanying drawings, in which.

DETAILED DESCRIPTION

The present invention is directed to an electrodeionization apparatus and method including an expanded conductive mesh electrode, which provides high purity water with low electrical resistance and improved electric current distribution. An electrodeionization apparatus or device may be based on technologies such as continuous electrodeionization, electrodiaresis, filled-cell electrodialysis, electrochemical ion exchange, capacitive deionization and the like. Moreover, an electrodeionization apparatus may be based on various configurations, such as a spiral design, as disclosed, for example, by Rychen et al., in U.S. Pat. No. 5,376,253, a plate and frame design as disclosed, for example, by DiMascio et al., in U.S. Pat. No. 5,858,191 and a circular design comprising electrically inert disk-shaped spacers having a central hub and upper and lower surfaces, as disclosed, for example, by Liang et al., in U.S. Pat. No. 5,292,422, each incorporated by reference in their entireties.

Figure 1:
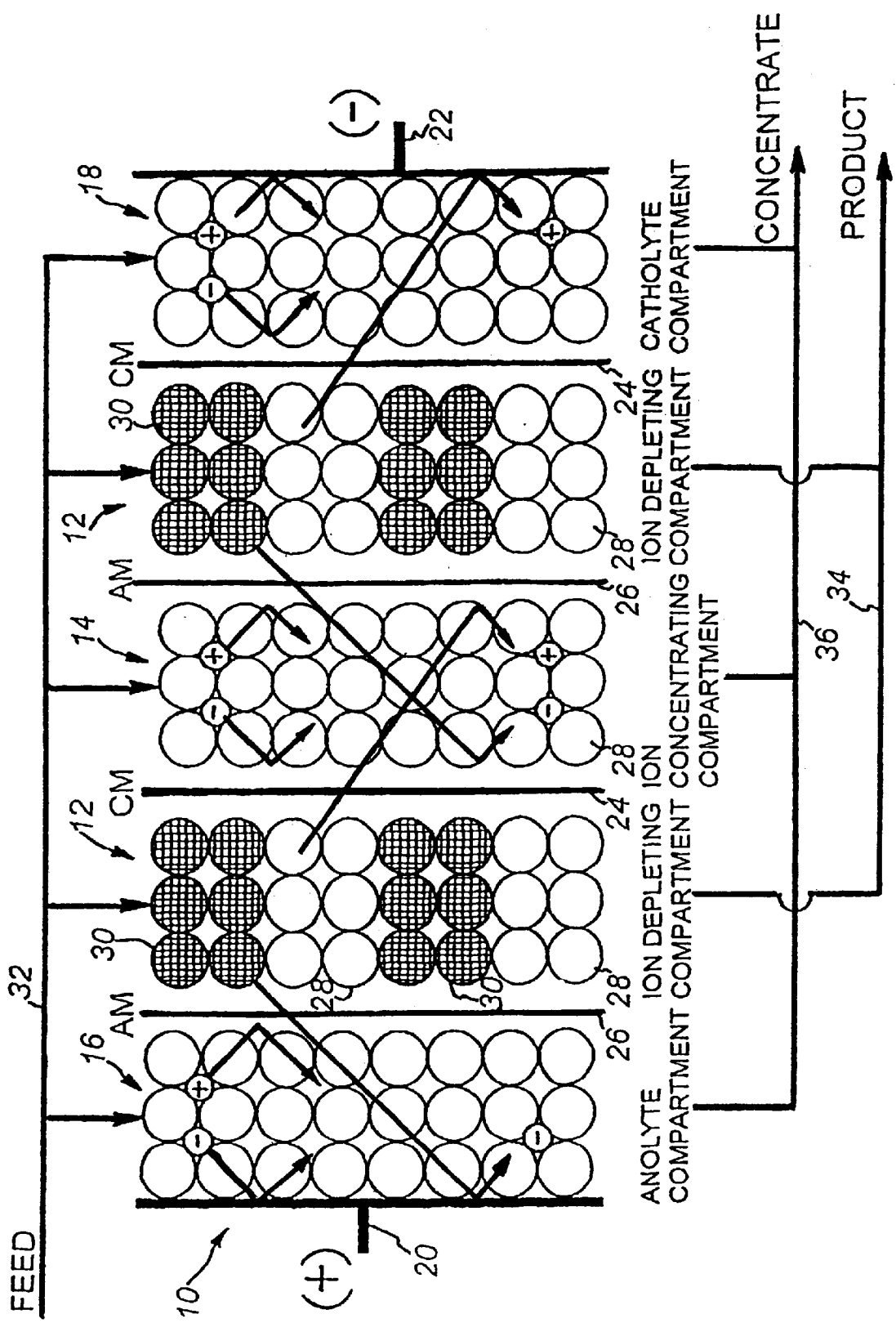
FIG. 1 is a schematic, sectional view through an electrodeionization apparatus, illustrating the fluid and ion flow direction through an ion-depleting, ion-concentrating and electrolyte compartments.

In FIG. 1, a schematic, cross-sectional view of the fluid and ion flow paths through one embodiment of an electrodeionization apparatus or module of the present invention is shown. The electrodeionization apparatus 10 comprises at least one ion-depleting compartment 12 and at least one ion-concentrating compartment 14. The ion-depleting compartments are typically bordered by an anolyte compartment 16 and a catholyte compartment 18. Typically, endblocks are positioned adjacent to endplates (not shown) to house an anode 20 and a cathode 22 in their respective compartments. The compartments are typically bordered by cation-selective membranes 24 and anion-selective membranes 26, which are typically sealed to the periphery of both sides of the compartments. The cation- and anion-selective membranes are typically heterogeneous polyolefin-based membranes, which are typically extruded by a thermoplastic process using heat and pressure to create a composite sheet.

Electroactive media is typically housed within a central space between the ion-permeable membranes 24 and 26. The ion-concentrating compartment is typically filled with cation exchange resins 28 and the ion-depleting compartments are preferably filled with alternating layers of a cation exchange resin 28 and an anion exchange resin 30. In a preferred arrangement, there are at least two layers in the ion-depleting compartment (a cation resin layer and an anion resin layer). The number of layers in the ion-depleting compartment is typically determined by the height of the module frame, such that the thickness of each cation or anion resin layer is adequate to reduce shifting and undesired mixing of the alternating layers of resins during use.

In another embodiment, the ion-concentrating compartment may also be filled with alternating layers of cation exchange and anion exchange resins. The arrangement of alternating layers in the ion-concentrating compartment, in addition to the alternating layers in the ion-depleting compartment, it is believed, would eliminate or at least reduce the likelihood of a direct path of current flow from electrode to electrode through the cation resin (which typically has lower electrical resistance than anion resin). This arrangement, it is believed, enhances the uniformity of the electric current distribution.

In one embodiment, a liquid to be purified is passed through at least one cell pair in the electrodeionization apparatus comprising an ion-depleting compartment 12 and ion-concentrating compartment 14. In one arrangement, there are between 5 to 100 such units or modules in an electrodeionization apparatus to provide adequate liquid flow-through capacity.

In another embodiment, the electrodeionization apparatus can comprise one or a plurality of stages. Preferably, in each stage, an anode is positioned at an opposite end of a stack of depleting and concentrating compartments from an end at which a cathode is positioned. Each anode and cathode may be formed from an expanded conductive mesh and provided with an ion-permeable membrane and an endblock, wherein electrolyte passes through the expanded conductive mesh. The remaining portion of each stage may comprise a series of alternating ion-depleting and ion-concentrating compartments. Notably, other arrangements besides alternating ion-depleting and ion-concentrating compartments are contemplated. For example, each stage may comprise a series or pairs of alternating ion-depleting and ion-concentrating compartments so that two ion-depleting compartments may be placed adjacent and surround an ion-concentrating compartment or two or more adjacent ion-concentrating compartments may border two or more ion-depleting compartments.

The liquid, typically feed water, to be purified or depleted of ions or ionizable species can be passed in parallel through each ion-depletion compartment in each stage to remove ions into a second liquid in the ion-concentrating compartments. The direction of flow within the ion-depleting compartments is not critical and can be in the same direction or in an opposite direction to the flow in an adjacent compartment or ion-concentrating compartment. If pluralities of stages are utilized, the liquid removed from the ion-depleting compartments in an upstream stage can be directed in series into the ion-depleting compartments in the next or any adjacent downstream or upstream stage. Alternatively, feed water can be directed in a counter flow arrangement in ion-depleting compartments comprising a second or any subsequent stage.

In typical operation, a liquid 32 to be purified, typically having dissolved, dissolvable or ionizable cationic or anionic components or species, is fed through the ion-depleting compartments 12, wherein the cationic components are attracted to the cation exchange resin 28 and the anionic components are attracted to the anion exchange resin 30. Preferably, an electric field is applied through the electrodes 20 and 22 at the opposite ends of the module. The electric current typically passes perpendicularly to the fluid flow such that the dissolved cationic or anionic components migrate from the ion exchange resin layers in the direction of their corresponding attracting electrode. Cationic components typically migrate through the cation-selective membrane 24 into the adjacent ion-concentrating compartment 14. An anion-selective membrane 26, typically on the opposite side of the ion-concentrating compartment, prevents or inhibits further migration, thereby trapping the cationic components in the ion-concentrating compartment.

The transport process for the anionic components is analogous but occurs in the opposite direction. Typically, anionic components migrate through an anion-selective membrane into the ion-concentrating compartment and a cation-selective membrane, typically on the other side of the ion-concentrating compartment, prevents or inhibits further migration of these ionic components and thereby trapping them in the ion-concentrating compartment. As the liquid flows through the module, ionic components are further depleted from the ion-depleting compartments and increased in the ion-concentrating compartments; thus, a high purity, product stream and a concentrate stream are produced.

During the application of electrical current in the electrodeionization module, a polarization phenomenon typically occurs and leads to the dissociation of water into hydrogen and hydroxyl ions. In a preferred embodiment, the hydrogen and hydroxyl ions are generated and, in turn, regenerate the ion exchange resins in the ion-depleting compartments so that removal of the dissolved ionic components may occur continuously and without a separate step for regenerating the exhausted ion exchange resins. The dissociation of water may occur at various locations within the electrodeionization device, but preferably it occurs at the bipolar interfaces in the electrodeionization device, where cation exchange material contacts anion exchange material in the ion-depleting compartment or where localized conditions of low solute are most likely to occur. It is believed the electrodeionization device has two primary areas of bipolar interfaces, namely, where resins contact the membrane, referred to as the resin/membrane interface or contact including both the cation membrane/anion resin and anion membrane/cation resin interfaces and where the resin contacts resin, referred to as the resin/resin interface or contact. The resin/membrane interface is typically perpendicular to the current flow or direction and the interface is between a flat membrane and spherical resin beads. It is also believed that if a majority of the water dissociation occurs at the resin/membrane interface, the maximum amount of resin in the ion-depleting compartment will be regenerated.

The second area in the electrodeionization device where a bipolar interface exists is the resin/resin interface. This area is typically located between each cation exchange resin layer and anion exchange resin layer. The resin/resin interface is typically parallel to the current flow. This second area may provide the path of least electrical or ionic resistance, allowing the majority of the current to travel therethrough. It is believed that if water dissociation occurs where the current travels, the majority of water dissociation may occur at the resin/resin interface, thereby regenerating only those resins that surround this interface. Consequently, only a small portion of the resin bed is used, resulting in lower product quality and lower overall efficiency.

Expanded conductive mesh electrodes may be formed from any conductive material, for example, metal, conductive polymers and conductive ceramics. In one embodiment, an expanded conductive mesh electrode is formed from any metal that is dimensionally stable, for example, titanium, niobium, tantalum, aluminum, zirconium and vanadium. In a preferred embodiment, the coating is electrochemically stable or inert such that it remains dimensionally stable and resists chemical or electrochemical degradation. More preferably, the expanded conductive mesh is titanium. The use of valve metals as well as other metals, elemental metals or alloys, is contemplated, for example, nickel and steel. By use of elemental metals, it is meant the metals in their normally available condition, for example, having minor amounts of impurities. Thus, for titanium, various grades of the metal are available including those in which other constituents may be alloys or alloys plus impurities. Grades of titanium have been more specifically set forth in the standard specifications for titanium detailed in ASTM B265-79.

The expanded mesh may also be coated with an electroactive coating, for example, platinum, ruthenium oxide, iridium oxide, rhodium oxide, tantalum oxide and gold or mixtures thereof. In a preferred embodiment, the coating is electrochemically stable or inert such that it remains dimensionally stable and resists electrochemical or chemical degradation. More preferably, the expanded conductive mesh is coated with platinum. Expanded conductive mesh cathodes may be formed from any material. For example, the expanded mesh cathode may be formed from stainless steel, Inconel and Hastelloy. Preferably, the expanded mesh cathode is formed from 316 stainless steel.

Expanded metal meshes may be formed by slitting a sheet of metal and pulling its sides in a direction perpendicular to the slits. Typically, after fabrication, the mesh is not flat due to distortion of the metal during stretching. The expanded mesh may then optionally be flattened, for example, by calendering. Alternatively, flattening the expanded mesh may be performed by compressing the mesh between platens of a press. Notably, only a portion of the expanded mesh may be flattened so that the resulting mesh electrode may have flattened and non-flattened regions. Expanded metal meshes are commercially available from, for example, Magneto Chemie B.V. and Eltech Systems Corporation.

Expanded conductive mesh electrodes may be of any pattern, for example, a diamond pattern. The sizing of the pattern may be any size that provides support for an adjacent ion-permeable membrane but also allows an electrode stream to flow through the mesh. In one embodiment, the diamond pattern has a LWD ranging from about 0.1 inch to about 1 inch, preferably from about 0.25 inch to about 0.5 inch, more preferably about 0.4 inch and a ratio of LWD::SWD of about 0.5:1 to about 4:1, preferably about 2:1. LWD and SWD as used herein means the long way dimension of the design and the short way dimension of the design, respectively.

In another embodiment, the mesh electrode may be fabricated by punching a perforation through a sheet or plate of electrode material. The shape of the punch or die may be circular, rectangular, square or any geometric or even random shape. The perforations through the plate may be arranged in a random order or may be arranged in a predetermined pattern. The size of the perforations may range from about 0.1 inch to about 1 inch, preferably from about 0.25 inch to about 0.5 inch, more preferably about 0.4 inch. In another embodiment, the perforations are separated by about 0.1 inch to about 1 inch, preferably from about 0.25 inch to about 0.5 inch and more preferably about 0.4 inch.

Figure 2:
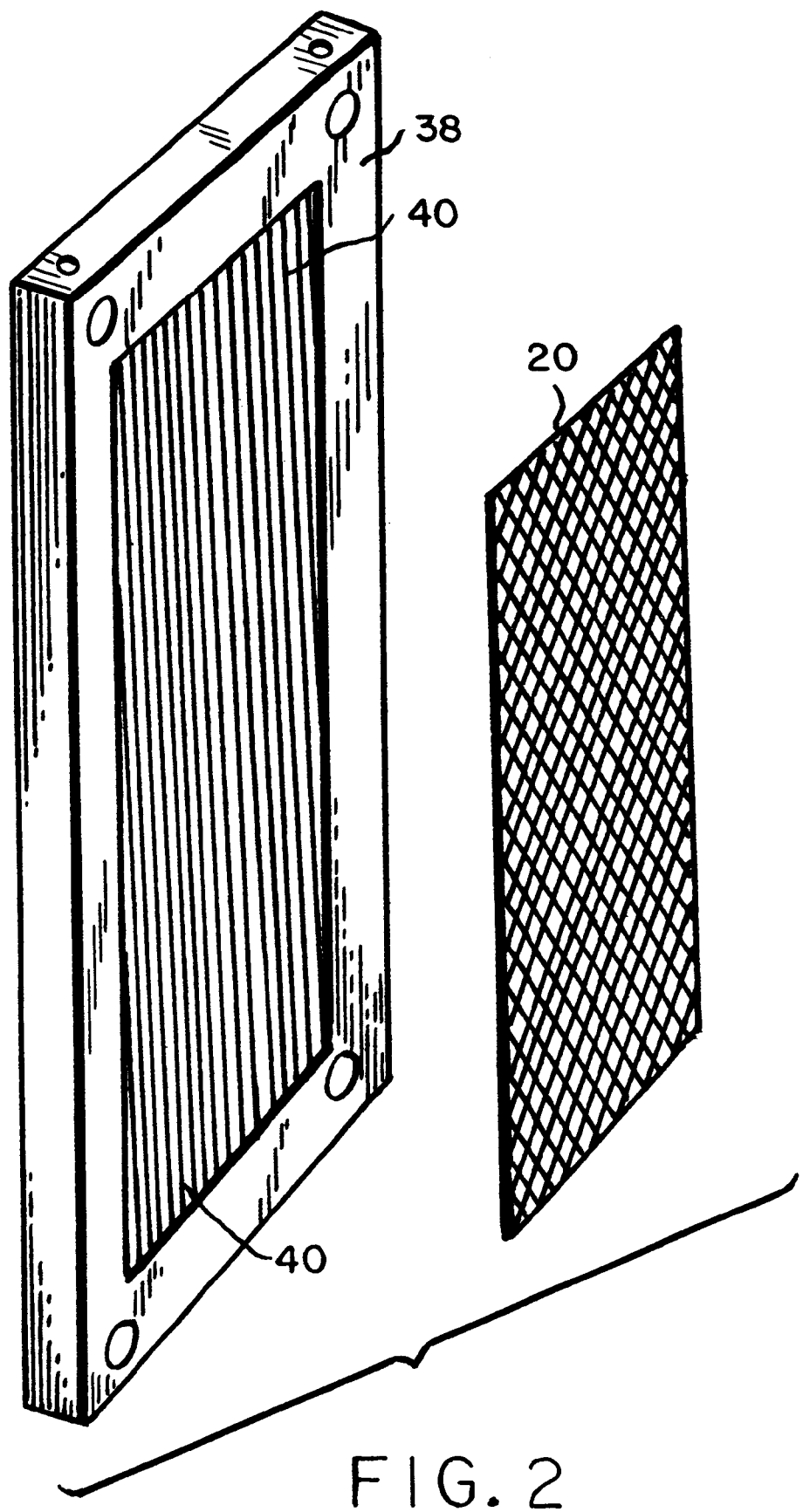
FIG. 2 is an exploded view of an electrode compartment of the electrodeionization apparatus of the present invention.

In another aspect of the present invention, FIG. 2 shows an exploded view of an electrode of the electrodeionization apparatus 10. In particular, FIG. 2 shows an electrode 20 or 22 and an endblock 38. The electrode may be an expanded mesh electrode or may be a flat plate electrode. Endblock 38 may be formed from a nonconductive material and may be machined or molded. In a preferred embodiment, endblock 38 is formed from an inert plastic, for example, high density polyethylene, polyvinylchloride, polycarbonate, polypropylene, structural foamed polypropylene, glass-reinforced polypropylene, polyphenylsulfone and polyvinylchloride. Preferably, endblock 38 comprises an inner surface with fluid flow channels 40 configured in any pattern that allow fluid flow adjacent an expanded mesh or flat plate electrode, for removing or flushing away gases and chemicals. In one embodiment, flow channels 40 are serpentine or parallel channels. In one preferred embodiment, the flow channels are substantially straight parallel troughs. In another embodiment, flow channels 40 are formed of a combination of serpentine, parallel or diagonal channels. In yet another embodiment, flow channels 40 are arranged or configured to correspond or match against the openings of an expanded mesh or perforated plate electrode.

In another embodiment, electrodes 20 or 22 are formed from an expanded conductive mesh and positioned so that a surface of the expanded conductive mesh electrode is in contact with an ion-permeable membrane and an opposing surface of the expanded conductive mesh electrode is in contact with the inner surface of endblock 12. Expanded conductive mesh electrodes 20 or 22 may be formed from any conductive material, for example, metals, conductive polymers and conductive ceramics.

Figure 3:
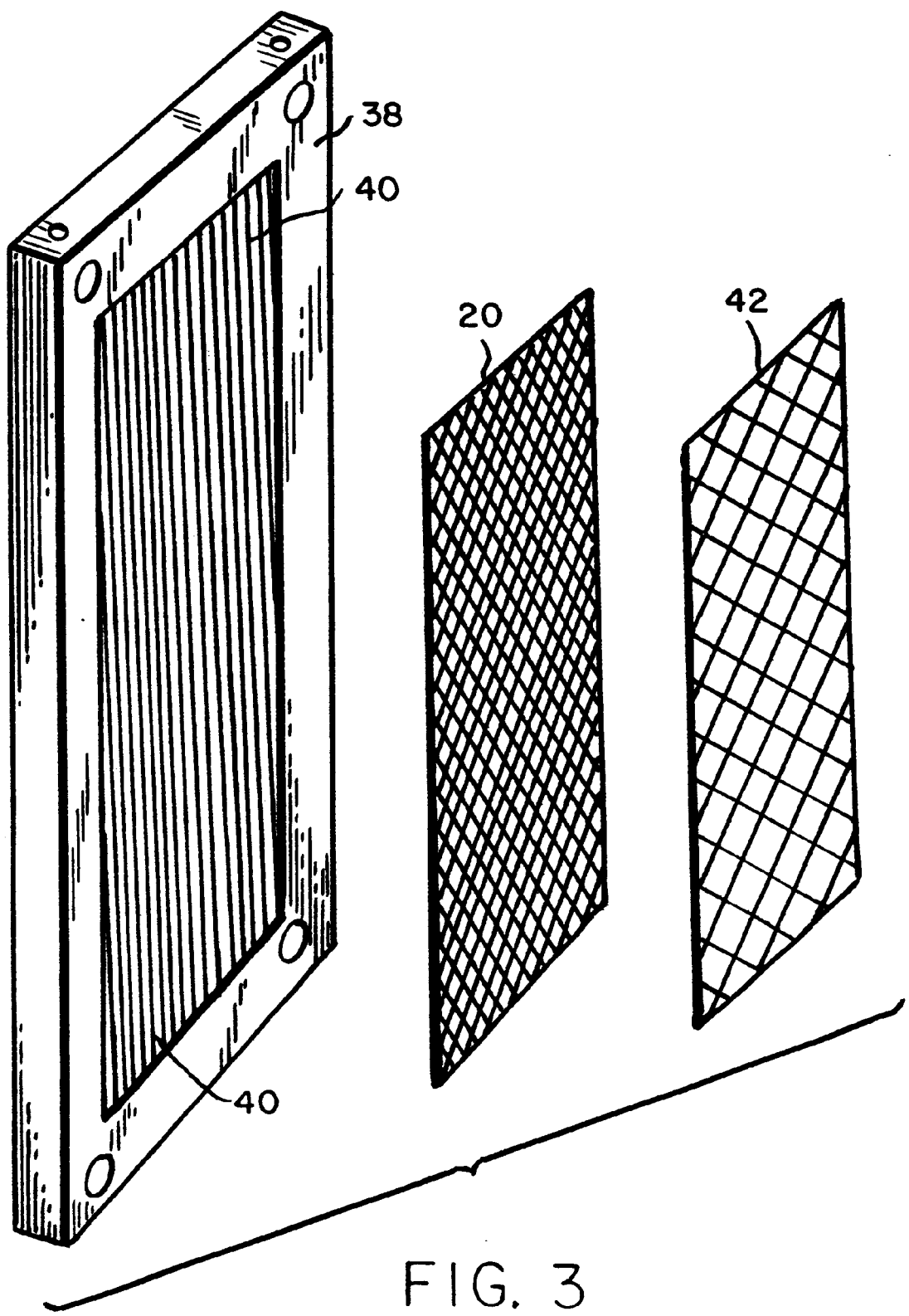
FIG. 3 is another exploded view of an electrode compartment of the electrodeionization apparatus of the present invention showing an endblock, an expanded mesh electrode and a spacer.

In another embodiment, electrodes 20 or 22 are positioned so that a gap exists between the surface of the mesh electrode and the ion-permeable membrane or the endblock. The gap or spacing between the electrode, a flat plate, a mesh or a perforated plate electrode, may be created by inserting a spacer or any other type of structure shaped and sized to displace or set the electrode a distance from the ion-permeable membrane, the endblock or both. For example, FIG. 3 shows an exploded view of an electrode compartment with endblock 38, electrode 20 and a spacer 42. Thus, in one embodiment, the spacer is a structure that displaces the electrode at a predetermined position relative to the ion-permeable membrane, the endblock or both. In yet another embodiment, the spacer may attach the electrode to a supporting structure so that the distance between electrode may be varied. For example, spacer 42 may be a screen, a woven mesh or fabric or may be any structure shaped to dispose or position the electrode. In another embodiment, the spacer is a structure that permits or promotes fluid flow in a vertical, horizontal, perpendicular, or preferably, random direction in the fluid region immediately adjacent the electrode. The spacer may contact a surface or at least a portion of the surface of the electrode and may be shaped to dispose the electrode while, preferably, channeling or promoting the mixing of fluid adjacent the electrode. Thus, in another embodiment, spacer 42 may be a flow mixer that promotes removal or rejection of any gas or trapped bubbles by, for example, fluid redirection.

Spacer 42 may be made from any inert material, for example, any plastic or polymeric material suitable for use in the electrodeionization apparatus, for example, a polyester or polypropylene woven mesh or fabric. The spacer, such as a woven or extruded mesh, netting or screen, may have the same size or may be smaller than the electrode. Preferably, spacer 42 has a thickness of less than about 0.1 inch, more preferably less than 0.01 inch, even more preferably less than 0.005 inch. In another embodiment, the electrode, a flat plate, an expanded mesh or a perforated plate electrode, is positioned between spacers of either the same or different sizes or the same or different thickness. In another embodiment, the spacer, preferably positioned adjacent the electrode, helps or improves the mixing or flow distribution of fluid in a region near or around the electrode. For example, the spacer may be a flow mixer that mixes, promotes or creates cross-flow of surrounding fluid around the electrode. The cross-flow, in one embodiment, may be created by the nature of the weave of the screen, mesh or netting. Accordingly, the spacer or flow mixer may have any weave pattern that promotes a desired fluid flow in the region adjacent to the electrode. In another embodiment, the spacer is made of an inert material or an extruded plastic, for example, polyethylene, polypropylene, polytetrafluorethylene, having a pattern including, for example, a square, box or diamond pattern.

Ion-permeable membranes 24 and 26 may be neutral, anion-permeable or cation-permeable. The cation- and anion-permeable membranes are typically heterogeneous polyolefin-based membranes, which are typically extruded by a thermoplastic process using heat and pressure to create a composite sheet. Any anion-permeable membrane or cation-permeable membrane having the strength to withstand the operating pressure differential, typically up to about 5 psid, can be utilized in the present invention. It should be pointed out that sealing of the membranes to ribs forming the subcompartments (not shown) permits the use of higher operating pressures and increases the assembly strength. Representative suitable anion-permeable membranes include, for example, homogeneous type web supported styrene-divinylbenzene-based resin with sulfonic acid or ammonium functional groups; heterogeneous type web-supported styrene-divinylbenzene-based resin in a polyvinylidene fluoride binder such as MC-3470 and MA-3475 membranes, available from Sybron Chemicals, Inc. (Birmingham, N.J.); homogeneous type unsupported sulfonated styrene and vinylbenzylamine grafts of polyethylene sheets; and homogeneous type web supported styrene-divinylbenzene based with sulfonic acid or quaternary ammonium functional groups sold as ACIPLEX® membranes, available from Asahi Chemical Industry, Ltd. (Japan).

In addition, the cation-permeable and anion-permeable membranes are typically comprised of an ion exchange powder, a polyethylene powder binder and a glycerin lubricant. Ion exchange powders are readily available; for example, cation exchange powders are commercially available as PUROLITE™ C-100IP powder and anion exchange powders are commercially available as PUROLITE™ A-430IP powder, available from Purolite Company (Bala Cynwyd, Pa.). As is known to those in the art, the membranes are formed by mixing the raw material and forming and extruding pellets made from the material into composite sheets.

In another embodiment, the ion-permeable membrane is made of a fluoro or perfluoropolymer, or a copolymer of two or more fluoro or perfluoromonomers, at least one of which has pendant sulfonic acid groups. It is believed that the presence of carboxylic groups, is not desirable, since those groups tend to decrease the conductivity of the membrane when they are protonated. These membranes typically comprise hydrated, copolymers of polytetrafluoroethylene and polysulfonyl fluoride vinyl ether-containing pendant sulfonic acid groups. Various suitable resin materials are available commercially or can be made according to patent literature. Suitable resin materials include, for example, fluorinated polymers with side chains of the type $-CF_2CFRSO_3H$ and $-OCF_2CF_2CF_2SO_3H$ where R is an F, Cl, $CF_2Cl$, or $C_1$ to $C_{10}$ perfluoroalkyl. Moreover, the resin material may be, for example, a copolymer of tetrafluoroethylene with a perfluorosulfonic acid or $CF_2=CFOCF_2CF(CF_3)OCF_2CF_2SO_3H$. In other embodiments, these resins may have $-SO_2F$ pendant groups, rather than $-SO_3H$ pendant groups or a combination thereof. In another embodiment, the sulfonyl fluoride groups may be hydrolyzed with potassium hydroxide to $-SO_3K$ groups. Suitable commercially available membranes include, for example, NAFION™ 117 membrane, available from E.I. Du Pont de Nemours and Company (Wilmington, Del.).

Electroactive media may be housed in the ion-depleting compartment 12. Optionally, ion-concentration compartments 14 may comprise anion exchange resin 30 and/or cation exchange resin 28. Each compartment may contain 100% anion exchange resin, 100% cation exchange resin or a mixture or combination of both. If both anion and cation exchange resins are used in a single compartment, they may be mixed or layered. The ion exchange resin may be in fiber or bead form. The ion exchange resin beads may vary in bead size or have a substantially uniform bead size wherein 90% of the beads are within 10% of the mean bead size. The layer or layers of cation and anion exchange resin beads may be doped with a dopant that may be made from an inert or electroactive media so that the predominant mechanism of ion exchange in the layer comprising the dopant material is the transport of ions of interest. For example, the layers of cation exchange resin beads may be doped with an anion exchange resin, an inert material and activated carbon. Similarly, the layers of anion exchange resin beads may be doped with a cation exchange resin, an inert material and activated carbon.

The electroactive media may include a quantity of anion resin materials having weak base functional groups on their surface regions, such as tertiary alkyl amino groups, or anion resin materials containing Type II functional groups on their surface regions, for example, dimethyl ethanolamine. These materials may also be used in combination with anion exchange resin materials containing Type I functional groups (quaternary ammonium groups) on their surface regions. As disclosed by Simons in "The Origin and Elimination of Water-Splitting in Ion Exchange Membranes During Water Demineralization by Electrodialysis," *Desalination*, 28 (1979), pp. 41–42, incorporated herein by reference in its entirety, at current values above the limiting current, water will only dissociate at the interfaces between oppositely charged materials when the anion materials contains weak base groups in the surface regions, such as tertiary alkyl amino groups. When utilizing strong acid-base resin materials such as beads, the ratio of anion exchange resin beads to cation exchange resin beads generally are about 60 to 40% by volume. Examples of commercially available anion resins include, but are not limited to, DOWEXT™ WBA™ resins and MARATHON™ A resins, available from Dow Chemical Company (Midland Mich.), AMBERJET™ 4600 resins, available from Rohm & Haas Corporation (Philadelphia, Pa.). An example of commercially available cation resins includes, but is not limited to, DOWEX™ MARATHON™ C resins from Dow Chemical Company (Midland, Mich.).

In a preferred embodiment, the electrolyte compartments are free of electroactive media; however, the use of electroactive media is contemplated. The preferred electroactive media are chemical, high-temperature and fouling resistant synthetic carbonaceous adsorbents. More preferably, the material is a carbonaceous char having catalytic properties and less than 0.5% ash impurities. In addition to the above mentioned anion and cation exchange resins, the electrolyte compartments may include, but are not limited to, synthetic activated carbons, hyper cross linked sorbent resins such as HYPERSOL-MACRONET™ resins, available from Purolite Company (Bala Cynwyd, Pa.), synthetic carbonaceous adsorbents such as AMBERSORB™ absorbents, available from Rohm & Haas Corporation (Philadelphia, Pa.) and G-BAC™ adsorbents, available from Kureha Chemical Industry Cp., Ltd. (Japan), polymeric adsorbent resin beads that are prepared by alkylene bridging halo-alkylated, porogen-modified, cross-linked copolymer beads, having microporosities in the range of at least about 0.05 cm$^3$/g as disclosed, for example, by Stringfield, in U.S. Pat. No. 5,460,725 and catalytic carbon as disclosed, for example, by Hayden, in U.S. Pat. No. 5,444,031 and Matviya et al., in U.S. Pat. No. 5,356,849, each incorporated by reference in their entireties.

In another aspect of the invention, the electrodeionization steps may be operated under conditions of polarity reversal during water purification. Thus, during operation, the current direction applied to the electrodes in the electrodeionization apparatus may be reversed in order to dissolve and desorb any organic material at the cathode, to oxidize deposits or scale and dissolve any scale from prior cycles in the depletion compartments and to desorb any foulants. Because of the voltage reversal, the compartments which were initially ion-depleting compartments become ion-concentration compartments. Current reversal may be performed according to a predetermined schedule or period or may be performed according to a predetermined condition. For example, current reversal may be initiated when an operating condition of the electrodeionization device indicates fouling or reduced efficiency, such as, a higher pH, higher temperature, lower flow rate or lower conductivity.

The present invention will be further illustrated by the following examples, which are illustrative in nature and are not to be considered as limiting the scope of the invention.

EXAMPLES

The following examples used a 10 cell pair electrodeionization apparatus with interchangeable electrodes. For comparison, each experiment was conducted with a pair of flat plate electrodes and then repeated with a pair of expanded conductive mesh electrodes. The flat plat electrodes and the expanded conductive mesh electrodes were formed from titanium coated with 30 micrometers of platinum and were operated at normal electrode polarity only. A polyethylene spacer was positioned between the flat plate electrodes and the ion-permeable membranes. The flat plate electrolyte compartments were free of electroactive media.

The stack was filled with a standard mixture of DOWEX™ MARATHON™ A anion resins and of DOWEX™ MARATHON™ C cation resins. Deionized water at a conductivity of between about 17 and about 18 Meg-ohm was used in the stack. Water with a conductivity of about 18 meg-ohm at a temperature of between about 12° C. and about 17° C. was used in the electrode chambers. All experiments were conducted at a constant current of 1 Amp (except where noted). Platinum wires were positioned at the top, middle and bottom beneath each end membrane. The system was allowed to stabilize for 8 minutes before voltage readings were recorded. Voltage drops were measured from the nearest electrode to the platinum wire. The voltage was measured with a Model 87 Series III digital multimeter, available from Fluke Corporation (Everett, Wash.) and temperature was measured with a standard mercury thermometer. Raw data collected at temperatures of 12.2–19.8° C. was normalized to 25° C. assuming a 2% change occurs for every degree (° C.) difference in actual temperature.

Example 1

The effectiveness of an electrodeionization apparatus of the present invention was evaluated with respect to a conventional electrodeionization apparatus using flat plate electrodes. 18 Meg-ohm electrode water was fed parallel and upwardly to the electrode chambers at 0.36, 0.5 and 0.66 lpm. Current was maintained at 1 Amp with expanded conductive mesh electrodes and at 0.15–0.18 Amp for flat plate electrodes. Results for the expanded conductive mesh and flat plate electrodes are reported in Table 1 and Table 2, respectively.

TABLE 1

| | Expanded Conductive Mesh, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 14.1 | | 13.3 | | 13.5 | |
| Stack Temp (° C.) | Actual | Corrected | Actual | Corrected | Actual | Corrected |
| Anode Voltage Drop at 10 minutes | | | | | | |
| Top | 1.50 | 1.17 | 0.47 | 1.13 | 1.46 | 1.12 |
| Middle | 1.43 | 1.12 | 1.37 | 1.05 | 1.30 | 1.00 |
| Bottom | 1.32 | 1.03 | 1.27 | 0.97 | 1.23 | 0.95 |
| Average | 1.42 | 1.11 | 1.37 | 1.05 | 1.33 | 1.02 |
| Cathode Voltage Drop at 10 minutes | | | | | | |
| Top | 3.10 | 2.42 | 3.09 | 2.37 | 3.17 | 2.44 |
| Middle | 3.15 | 2.46 | 3.13 | 2.40 | 3.23 | 2.49 |
| Bottom | 3.01 | 2.35 | 3.03 | 2.32 | 3.46 | 2.66 |
| Average | 3.09 | 2.41 | 3.08 | 2.36 | 3.29 | 2.53 |
| System Voltage | 50 | 39.1 | 48.0 | 36.8 | 63.0 | 48.5 |
| Stack Voltage Drop at 8 minutes | | | | | | |
| Top | 45.0 | 35.2 | 43.0 | 32.9 | — | — |
| Middle | 44.8 | 35.0 | 42.9 | 32.9 | — | — |
| Bottom | 44.8 | 35.0 | 43.0 | 32.9 | — | — |
| Average | 44.9 | 35.1 | 43.0 | 32.9 | — | — |

TABLE 1-continued

| | Expanded Conductive Mesh, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 14.1 | | 13.3 | | 13.5 | |
| Stack Temp (° C.) | Actual | Corrected | Actual | Corrected | Actual | Corrected |
| Stack + Electrode Voltage Drop | 49.4 | 38.6 | 47.4 | 36.3 | — | — |
| System Voltage at 8 minutes | 50 | 39.1 | 49 | 37.5 | — | — |

As seen in Table 1, for expanded conductive mesh electrodes, the anode voltage drop for electrode flow rates of 0.36, 0.5 and 0.66 lpm averaged 1.11, 1.05 and 1.02 V, respectively. The cathode voltage drop for electrode flow rates of 0.36, 0.5 and 0.66 lpm averaged 2.41, 2.36 and 2.53 V, respectively and the stack voltage drop averaged 35.1 and 32.9 V, respectively. It is noted that at a system current of 1 Amp, the aforementioned voltage drops equaled the resistivities. The variation in anode voltage drop within the top, middle and bottom was 0.14, 0.16 and 0.17 V and the variation in cathode voltage drop within the top, middle and bottom was 0.07, 0.08 and 0.22 V for flow rates of 0.36, 0.5 and 0.66 lpm, respectively. The variation in stack voltage drop was 0.2 and 0.1 V for flow rates of 0.36 and 0.5 lpm, respectively.

tively. The stack voltage drop for electrode flow rates of 0.36, 0.5 and 0.66 lpm averaged 14.2, 11.2 and 11.1 V, respectively. It is noted that at a system current of 0.15–0.17 Amp, the resistivity at the anode averaged 1,386, 1,144 and 1,293 Ω for flow rates of 0.36, 0.5 and 0.66 lpm, respectively. Similarly, at flow rates of 0.36, 0.5 and 0.66 lpm and at a system current of 0.15–0.17 Amp, the cathode resistivity averaged 53, 67 and 141 Ω, while the stack resistivity was 94.7, 62.2 and 74 Ω. The variation in anode voltage drops within the top, middle and bottom was 2.0 V for each flow rate. The variation in cathode voltage drops within the top, middle and bottom was 1.4, 0.8 and 6.8 V for flow rates of 0.36, 0.5 and 0.66 lpm, respectively and the variation in stack voltage drops was 3.6, 2.7 and 4.6 V for their respective flow rates.

TABLE 2

| | Flat Plate, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 13.2 | | 12.9 | | 12.7 | |
| Stack Temp (° C.) | Actual | Corrected | Actual | Corrected | Actual | Corrected |
| Anode Voltage Drop at 10 minutes | | | | | | |
| Top | 271 | 207 | 271 | 205 | 258 | 195 |
| Middle | 274 | 209 | 273 | 207 | 258 | 195 |
| Bottom | 272 | 208 | 271 | 205 | 256 | 193 |
| Average | 272 | 208 | 272 | 206 | 257 | 194 |
| Cathode Voltage Drop at 10 minutes | | | | | | |
| Top | 9.9 | 7.6 | 15.2 | 11.5 | 23 | 17.3 |
| Middle | 11.7 | 8.9 | 16.2 | 12.3 | 29 | 22.1 |
| Bottom | 9.8 | 7.5 | 16.0 | 12.1 | 32 | 24.1 |
| Average | 10.5 | 8.0 | 15.8 | 12.0 | 28.1 | 21.2 |
| System Voltage | 301 | 230 | 301 | 228 | 301 | 227 |
| System Current | 0.15 | — | 0.17 | — | 0.15 | — |
| Stack Voltage Drop at 8 minutes | | | | | | |
| Top | 20.5 | 15.7 | 16.6 | 12.6 | 18.9 | 14.3 |
| Middle | 15.8 | 12.1 | 13.0 | 9.9 | 12.8 | 9.7 |
| Bottom | 19.5 | 14.9 | 14.6 | 11.1 | 12.4 | 9.3 |
| Average | 18.6 | 14.2 | 14.7 | 11.2 | 14.7 | 11.1 |
| Stack + Electrode Voltage Drop | 301 | 230 | 302 | 229 | 300 | 226 |
| System Voltage at 8 minutes | 301 | 230 | 301 | 228 | 301 | 227 |
| System Current at 8 minutes | 0.15 | — | 0.18 | — | 0.15 | — |

As seen in Table 2, for flat plate electrodes, the anode voltage drop for electrode flow rates of 0.36, 0.5 and 0.66 lpm averaged 208, 206 and 194 V, respectively and the cathode voltage drop averaged 8.0, 12.0 and 21.2 V, respec- When compared to the flat plate electrodes, the expanded conductive mesh electrodes showed significantly lower resistivity and increased uniformity from top to bottom. The resistivity of the expanded conductive anode was at least about 99% lower than the flat plate anode. Further, the resistivity of the expanded conductive mesh cathode was at least about 95% lower than the flat plate cathode. Moreover, the resistivity of the stack between the expanded conductive mesh electrodes was at least about 50% lower than the resistivity of the stack between the flat plate electrodes.

The variation in resistivities from top to bottom within the stack was substantially reduced with the expanded conductive mesh electrodes. The variation in the stack resistivity using the expanded conductive mesh electrodes was 0.2 and 0.0 V at 0.36 and 0.5 lpm, respectively. In contrast, the variation in the stack resistivity using the flat plate electrodes was about 24, 16 and 33 Ω for 0.36, 0.5 and 0.66 lpm, respectively. Notably, it is believed that a less uniform stack resistivity results in less water purity because some areas in the stack receive more current than others.

Use of the expanded conductive mesh electrodes also significantly reduced the amount of power required to supply the unit. With expanded conductive mesh electrodes, the system voltage necessary to achieve a system current of 1 Amp at 8 minutes was 39.1 and 37.5 V for flow rates of 0.36 and 0.5 lpm, respectively. In contrast, the system voltage for flat plate electrodes was 230 and 228 V for flow rates of 0.36 and 0.5 lpm, respectively. Moreover, even at the higher system voltage, the system current achieved with flat plate electrodes was only 0.15 and 0.18 Amp for their respective flow rates.

Example 2

The effectiveness of the electrodeionization apparatus of the present invention was evaluated with respect to a conventional electrodeionization apparatus using flat plate electrodes. 18 Meg-ohm electrode water was fed parallel and downwardly to the electrode chambers at 0.36, 0.5 and 0.66 lpm. Current was maintained at 1 Amp with expanded conductive mesh electrodes and at only 0.16 Amp for flat plate electrodes. Results for the expanded conductive mesh and flat plate electrodes are reported in Table 3 and Table 4, respectively.

TABLE 3

| | Expanded Conductive Mesh, Parallel and Downflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 13.2 | | 13.5 | | 13.5 | |
| Stack Temp (° C.) | Actual | Corrected | Actual | Corrected | Actual | Corrected |
| Anode Voltage Drop at 10 minutes | | | | | | |
| Top | 1.41 | 1.08 | 1.43 | 1.10 | 1.52 | 1.17 |
| Middle | 1.25 | 0.96 | 1.28 | 0.99 | 1.35 | 1.04 |
| Bottom | 1.23 | 0.94 | 1.29 | 0.99 | 1.31 | 1.01 |
| Average | 1.30 | 0.99 | 1.33 | 1.03 | 1.39 | 1.07 |
| Cathode Voltage Drop at 10 minutes | | | | | | |
| Top | 3.09 | 2.36 | 3.10 | 2.39 | 3.09 | 2.38 |
| Middle | 3.11 | 2.38 | 3.07 | 2.36 | 3.07 | 2.36 |
| Bottom | 3.22 | 2.46 | 3.28 | 2.53 | 3.29 | 2.53 |
| Average | 3.14 | 2.40 | 3.15 | 2.43 | 3.15 | 2.43 |
| System Voltage | 53.0 | 40.5 | 55.0 | 42.4 | — | — |
| Stack Voltage Drop at 8 minutes | | | | | | |
| Top | 48.5 | 37.1 | 52.8 | 40.7 | — | — |
| Middle | 48.3 | 36.9 | 52.7 | 40.6 | 54.0 | 41.6 |
| Bottom | 48.2 | 36.8 | 52.5 | 40.4 | — | — |
| Average | 48.3 | 36.9 | 52.7 | 40.6 | 54.0 | 41.6 |
| Stack + Electrode Voltage Drop | 52.8 | 40.3 | 57.2 | 44.0 | 58.5 | 45.1 |
| System Voltage at 8 minutes | 54 | 41.3 | 58 | 44.7 | 60 | 46.2 |

As seen Table 3, for expanded conductive mesh anodes, the anode voltage drop for electrode flow rates of 0.36, 0.5 and 0.66 lpm averaged 0.99, 1.03 and 1.07 V, respectively and the cathode voltage drop averaged 2.40, 2.43 and 2.43 V, respectively. The stack voltage drop for electrode flow rates of 0.36, 0.5 and 0.66 lpm averaged 36.9, 40.6 and 41.6 V, respectively. It is noted that at a system current of 1 Amp, the aforementioned to voltage drops equaled the resistivities. The variation in anode voltage drops within the top, middle and bottom was about 0.14, 0.11 and 0.16 V for flow rates of 0.36, 0.5 and 0.66 lpm, respectively. The variation in cathode voltage drops within the top, middle and bottom was 0.10, 0.17 and 0.17 V and the variation in stack voltage drops was 36.9, 40.6 and 41.6 V for flow rates of 0.36, 0.5 and 0.66 lpm, respectively.

V for flow rates of 0.36, 0.5 and 0.66 lpm, respectively and the variation in stack voltage drops averaged 0.6, 0.4 and 4.3 V, respectively.

When compared to the flat plate electrodes, the expanded conductive mesh electrodes showed significantly lower resistivity and increased uniformity from top to bottom. The resistivity of the expanded conductive mesh anode when compared to the flat plate anode was reduced by at least 99%. Similarly, the resistivity of the expanded conductive mesh cathode and stack was reduced by at least about 94% and at least about 36%, respectively.

In addition, use of the expanded conductive mesh electrodes significantly reduced the amount of power required to supply the unit. With expanded conductive mesh electrodes, the system voltage necessary to achieve a system current of

TABLE 4

| | Flat Plate, Parallel and Downflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 15.8 | | 12.4 | | 14.5 | |
| Stack Temp (° C.) | Actual | Corrected | Actual | Corrected | Actual | Corrected |
| Anode Voltage Drop at 10 minutes | | | | | | |
| Top | 277 | 226 | 277 | 207 | 275 | 217 |
| Middle | 279 | 228 | 278 | 208 | 276 | 218 |
| Bottom | 276 | 225 | 276 | 206 | 273 | 216 |
| Average | 277 | 226 | 277 | 207 | 275 | 217 |
| Cathode Voltage Drop at 10 minutes | | | | | | |
| Top | 8.3 | 6.8 | 9.8 | 7.3 | 13.7 | 10.8 |
| Middle | 7.5 | 6.1 | 9.0 | 6.7 | 12.5 | 9.9 |
| Bottom | — | — | — | — | 9.0 | 7.1 |
| Average | 7.9 | 6.4 | 9.4 | 7.0 | 11.7 | 9.3 |
| System Voltage | 301 | 246 | 301 | 225 | 301 | 238 |
| System Current | 0.16 | — | 0.16 | — | 0.16 | — |
| Stack Voltage Drop at 8 minutes | | | | | | |
| Top | 15.2 | 12.4 | 13.9 | 10.4 | 13.5 | 10.7 |
| Middle | 14.4 | 11.8 | 13.4 | 10.0 | 13.0 | 10.3 |
| Bottom | — | — | — | — | 18.5 | 14.6 |
| Average | 14.8 | 12.1 | 13.7 | 10.2 | 15.0 | 11.9 |
| Stack + Electrode Voltage Drop | 300.0 | 245 | 300 | 224 | 301 | 238 |
| System Voltage at 8 minutes | 301 | 246 | 301 | 225 | 301 | 238 |
| System Current at 8 minutes | 0.16 | — | 0.16 | — | 0.16 | — |

As seen in Table 4, for flat plate electrodes, the anode voltage drop at 10 minutes for electrode flow rates of 0.36, 0.5 and 0.66 lpm averaged about 226, 207 and 217 V, respectively. The cathode voltage drop at 10 minutes for electrode flow rates of 0.36, 0.5 and 0.66 lpm averaged 6.4, 7.0 and 9.3 V, respectively and the stack voltage drop averaged 12.1, 10.2 and 11.9 V, respectively. It is noted that at a system current of 0.16 Amp, the resistivity at the anode averaged about 1,412, 1,294 and 1,356 Ω for flow rates of 0.36, 0.5 and 0.66 lpm, respectively. Similarly, at a system current of 0.16 Amp, the resistivity at the cathode averaged about 40, 44 and 58 Ω for flow rates of 0.36, 0.5 and 0.66 lpm, respectively and the stack resistivity averaged about 76, 64 and 74 Ω, respectively. The variation in anode voltage drops within the top, middle and bottom was about 3 V for a flow rate of 0.36 lpm and averaged 2 V for flow rates of 0.5 and 0.66 lpm. The variation in cathode voltage drops within the top, middle and bottom was about 0.7, 0.6 and 3.7

1 Amp was 41.3, 44.7 and 46.2 V for flow rates of 0.36, 0.5 and 0.66 lpm, respectively. In contrast, the system voltage for flat plate electrodes was 246, 225 and 238 V for flow rates of 0.36, 0.5 and 0.66 lpm respectively at a current of 0.16 Amp. Moreover, even at the higher system voltage, the system current achieved with flat plate electrodes was only 0.16 for each flow rate.

Example 3

The effectiveness of the electrodeionization apparatus of the present invention was evaluated with respect to a conventional electrodeionization apparatus using flat plate electrodes. 18 Meg-ohm electrode water was fed in series and upwardly to the electrode chambers at 0.36, 0.5 and 0.66 lpm. Current was maintained at 1 Amp with expanded conductive mesh electrodes and 0.14–0.17 Amp for flat plate electrodes. Results for the expanded conductive mesh and flat plate electrodes are reported in Table 5 and Table 6, respectively.

TABLE 5

Expanded conductive Mesh, Series and Upflow

| Electrode Configuration | 0.36 lpm (5.7 gph) | | 0.5 lpm (7.9 gph) | | 0.66 lpm (10.5 gph) | |
|---|---|---|---|---|---|---|
| Electrode Flowrate | 13.0 | | 12.7 | | 12.3 | |
| Stack Temp (° C.) | Actual | Corrected | Actual | Corrected | Actual | Corrected |
| Anode Voltage Drop at 10 minutes | | | | | | |
| Top | 1.41 | 1.07 | 1.41 | 1.06 | 1.39 | 1.04 |
| Middle | 1.25 | 0.95 | 1.25 | 0.94 | 1.24 | 0.93 |
| Bottom | 1.26 | 0.96 | 1.25 | 0.94 | 1.23 | 0.92 |
| Average | 1.31 | 0.99 | 1.30 | 0.98 | 1.29 | 0.96 |
| Cathode Voltage Drop at 10 minutes | | | | | | |
| Top | 3.09 | 2.35 | 3.08 | 2.32 | 3.02 | 2.25 |
| Middle | 3.09 | 2.35 | 3.00 | 2.26 | 3.10 | 2.31 |
| Bottom | 3.29 | 2.50 | 3.25 | 2.45 | 3.22 | 2.40 |
| Average | 3.16 | 2.40 | 3.11 | 2.34 | 3.11 | 2.32 |
| System Voltage | 52.0 | 39.5 | 53.0 | 40.0 | 51.0 | 38.0 |
| Stack Voltage Drop at 8 minutes | | | | | | |
| Top | 47.7 | 36.3 | 47.4 | 35.7 | 46.1 | 34.4 |
| Middle | 47.6 | 36.2 | 47.4 | 35.7 | 45.9 | 34.2 |
| Bottom | 47.4 | 36.0 | 47.1 | 35.5 | 45.8 | 34.2 |
| Average | 47.6 | 36.2 | 47.3 | 35.7 | 45.9 | 34.3 |
| Stack + Electrode Voltage Drop | 52.0 | 39.5 | 51.7 | 39.0 | 50.3 | 37.5 |
| System Voltage at 8 minutes | 53 | 40.3 | 53 | 40.0 | 52 | 38.8 |

As seen in Table 5, for expanded conductive mesh electrodes, the anode voltage drop for electrode flow rates of 0.36, 0.5 and 0.66 lpm averaged 0.99, 0.98 and 0.96 V, respectively. The cathode voltage drop for electrode flow rates of 0.36, 0.5 and 0.66 lpm averaged 2.40, 2.34 and 2.32 V, respectively and the stack voltage drop averaged 36.2, 35.7 and 34.3 V, respectively. It is noted that at a system current of 1 Amp, the aforementioned voltage drops equaled the resistivities. The variation in anode voltage drops within the top, middle and bottom was about 0.12 V for all flow rates. The variation in cathode voltage drops within the top, middle and bottom was about 0.15, 0.19 and 0.15 V for flow rates of 0.36, 0.5 and 0.66 lpm, respectively and the variation in stack voltage drops was 0.3, 0.2 and 0.2 V, respectively.

TABLE 6

Flat Plate, Series and Upflow

| Electrode Configuration | 0.36 lpm (5.7 gph) | | 0.5 lpm (7.9 gph) | | 0.66 lpm (10.5 gph) | |
|---|---|---|---|---|---|---|
| Electrode Flowrate | 13.9 | | 12.5 | | 12.6 | |
| Stack Temp (° C.) | Actual | Corrected | Actual | Corrected | Actual | Corrected |
| Anode Voltage Drop at 10 minutes | | | | | | |
| Top | 266 | 207 | 265 | 199 | 246 | 185 |
| Middle | 266 | 207 | 265 | 199 | 245 | 184 |
| Bottom | 264 | 205 | 262 | 197 | 242 | 182 |
| Average | 265 | 206 | 264 | 198 | 244 | 184 |
| Cathode Voltage Drop at 10 minutes | | | | | | |
| Top | 16.0 | 12.4 | 17.5 | 13.1 | 37.0 | 27.8 |
| Middle | 18.2 | 14.2 | 21.0 | 15.8 | 43.0 | 32.3 |
| Bottom | — | — | — | — | — | — |
| Average | 17.1 | 13.3 | 19.3 | 14.4 | 40.0 | 30.1 |
| System Voltage | 301 | 234 | 301 | 226 | 301 | 229 |
| System Current | 0.17 | — | 0.16 | — | 0.14 | — |
| Stack Voltage Drop at 8 minutes | | | | | | |
| Top | 20.0 | 15.6 | 19.5 | 14.6 | 18.0 | 14 |
| Middle | 14.4 | 11.2 | 14.4 | 10.8 | 11.5 | 9 |

TABLE 6-continued

| | Flat Plate, Series and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 13.9 | | 12.5 | | 12.6 | |
| Stack Temp (° C.) | Actual | Corrected | Actual | Corrected | Actual | Corrected |
| Bottom | — | — | — | — | — | — |
| Average | 17.2 | 13.4 | 17.0 | 12.7 | 14.8 | 11.1 |
| Stack + Electrode Voltage Drop | 300 | 233 | 300 | 225 | 299 | 225 |
| System Voltage at 8 minutes | 301 | 234 | 301 | 226 | 301 | 226 |
| System Current at 8 minutes | 0.17 | — | 0.16 | — | 0.14 | — |

As seen in Table 6, for flat plate electrodes, the anode voltage drop for electrode flow rates of 0.36, 0.5 and 0.66 lpm averaged 206, 198 and 184 V respectively. The cathode voltage drop for electrode flow rates of 0.36, 0.5 and 0.66 lpm averaged 13.3, 14.4 and 30.1 V, respectively and the stack voltage drop averaged 13.4, 12.7 and 11.1 V, respectively. It is noted that at a system current of 0.17–0.14 Amp, the resistivity at the anode averaged about 1,212, 1,237 and 1,314 Ω for flow rates of 0.36, 0.5 and 0.66 lpm, respectively. Similarly, the resistivity at the cathode averaged 78, 90 and 215 Ω and the stack resistivity averaged 79, 79 and 79 Ω, respectively. The variation in anode voltage drops within the top, middle and bottom was 2 V for flow rates of 0.36 and 0.5 lpm and 3 V for a flow rate of 0.66 lpm. The variation in cathode voltage drops within the top, middle and bottom was 1.8, 2.7 and 4.5 V and the variation in stack voltage drops averaged 4.4, 3.8 and 5.0 V, respectively.

When compared to the flat plate electrodes, the expanded conductive mesh electrodes showed significantly lower resistivity and increased uniformity from top to bottom. The resistivity of the expanded conductive mesh anode when compared to the flat plate anode was lower by at least about 99%. Similarly, the expanded conductive mesh electrodes showed lower cathode and stack resistivities by at least about 96% and 54%, respectively.

The variation in stack resistivities from top to bottom was substantially reduced with the expanded conductive mesh electrodes. The variation in stack resistivity using expanded conductive mesh electrodes was 0.3, 0.2 and 0.2 Ω at 0.36, 0.5 and 0.66 lpm, respectively. In contrast, the variation in stack resistivity using the flat plate electrodes was 25.9, 23.8 and 35.7 Ω for 0.36, 0.5 and 0.66 lpm, respectively.

Use of the expanded conductive mesh electrodes also significantly reduced the amount of power required to supply the unit. With expanded conductive mesh electrodes, the system voltage necessary to achieve a system current of 1 Amp was 40.3, 40.0 and 38.8 V for flow rates of 0.36, 0.5 and 0.66 lpm, respectively. In contrast, the system voltage for flat plate electrodes was 234, 226 and 226 V for flow rates of 0.36, 0.5 and 0.66 lpm respectively. Moreover, even at the higher system voltage, the system current achieved by using flat plate electrodes was only 0.14–0.17 Amp.

Example 4

The effectiveness of the electrodeionization apparatus of the present invention was evaluated with respect to a conventional electrodeionization apparatus using flat plate electrodes. 3–5 µS/cm electrode water was fed parallel and upwardly to the electrode chambers at 0.36, 0.5 and 0.66 lpm. Results for the expanded conductive mesh and flat plate electrodes are reported in Table 7 and Table 8, respectively.

TABLE 7

| | Expanded Conductive Mesh, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 13.1 | | 13.2 | | 13.7 | |
| Stack Temp (° C.) | Actual | Corrected | Actual | Corrected | Actual | Corrected |
| Anode Voltage Drop at 10 minutes | | | | | | |
| Top | 1.46 | 1.11 | 1.53 | 1.17 | 1.62 | 1.25 |
| Middle | 1.27 | 0.97 | 1.30 | 0.99 | 1.41 | 1.09 |
| Bottom | 1.20 | 0.91 | 1.22 | 0.93 | 1.26 | 0.98 |
| Average | 1.31 | 1.00 | 1.35 | 1.03 | 1.43 | 1.11 |
| Cathode Voltage Drop at 10 minutes | | | | | | |
| Top | 2.96 | 2.26 | 3.03 | 2.31 | 3.18 | 2.46 |
| Middle | 3.09 | 2.35 | 3.14 | 2.40 | 3.15 | 2.44 |
| Bottom | 3.20 | 2.44 | 3.23 | 2.47 | 3.25 | 2.52 |
| Average | 3.08 | 2.35 | 3.13 | 2.39 | 3.19 | 2.47 |
| System Voltage | 52.0 | 39.6 | 55.0 | 42.0 | 60.0 | 46.4 |

TABLE 7-continued

| | Expanded Conductive Mesh, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 13.1 | | 13.2 | | 13.7 | |
| Stack Temp (° C.) | Actual | Corrected | Actual | Corrected | Actual | Corrected |
| Stack Voltage Drop at 8 minutes | | | | | | |
| Top | 47.6 | 36.3 | 51.0 | 39.0 | 56.6 | 43.8 |
| Middle | 47.3 | 36.0 | 50.8 | 38.8 | 56.5 | 43.7 |
| Bottom | 47.3 | 36.0 | 50.6 | 38.7 | 56.4 | 43.7 |
| Average | 47.4 | 36.1 | 50.8 | 38.8 | 56.5 | 43.7 |
| Stack + Electrode Voltage Drop | 51.8 | 39.5 | 55.3 | 42.2 | 61.1 | 47.3 |
| System Voltage at 8 minutes | 53 | 40.4 | 56 | 42.8 | 62 | 48.0 |

As seen in Table 7, for expanded conductive mesh electrodes, the anode voltage drop for electrode flow rates of 0.36, 0.5 and 0.66 lpm averaged 1.00, 1.03 and 1.11 V, respectively. The cathode voltage drops for electrode flow rates of 0.36, 0.5 and 0.66 lpm averaged 2.35, 2.39 and 2.47 V, respectively and the stack voltage drops averaged 36.1, 38.8 and 43.7 V, respectively. It is noted that at a system current of 1 Amp, the aforementioned voltage drops equaled the resistivities. The variation in anode voltage drops within the top, middle and bottom was 0.2, 0.24 and 0.27 V for flow rates of 0.36, 0.5 and 0.66 lpm, respectively. The variation in cathode voltage drops within the top, middle and bottom was 0.18, 0.16 and 0.08 V for flow rates of 0.36, 0.5 and 0.66 lpm, respectively and the variation in stack voltage drops was 0.3, 0.3 and 0.1 V, respectively.

As seen in Table 8, for flat plate electrodes, the anode voltage drop for electrode flow rates of 0.36, 0.5 and 0.66 lpm averaged 49.2, 48.1 and 43.4 V, respectively. The cathode voltage drop for electrode flow rates of 0.36, 0.5 and 0.66 lpm averaged 7.3, 7.7 and 8.7 V, respectively and the stack voltage drop averaged 30.5, 32.9 and 34.9 V, respectively. It is noted that at a system current of 1 Amp, the aforementioned voltage drops equaled the resistivities. The variation in anode voltage drops within the top, middle and bottom was 8.8, 10.5 and 10.1 V for flow rates of 0.36, 0.5 and 0.66 lpm, respectively. The variation in cathode voltage drops within the top, middle and bottom was 2.2, 2.5 and 3.3 V for flow rates of 0.36, 0.5 and 0.66 lpm, respectively and the variation in stack voltage drops was 3.6, 4.3 and 3.8 V, respectively.

TABLE 8

| | Flat Plate, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 14.3 | | 15.3 | | 14.6 | |
| Stack Temp (° C.) | Actual | Corrected | Actual | Corrected | Actual | Corrected |
| Anode Voltage Drop at 10 minutes | | | | | | |
| Top | 64.5 | 50.7 | 63.9 | 51.5 | 58.9 | 46.6 |
| Middle | 67.2 | 52.8 | 64.0 | 51.6 | 59.1 | 46.8 |
| Bottom | 56.0 | 44.0 | 51.0 | 41.1 | 46.4 | 36.7 |
| Average | 62.6 | 49.2 | 59.6 | 48.1 | 54.8 | 43.4 |
| Cathode Voltage Drop at 10 minutes | | | | | | |
| Top | 7.9 | 6.2 | 7.9 | 6.4 | 8.9 | 7.0 |
| Middle | 10.7 | 8.4 | 11.1 | 8.9 | 13.0 | 10.3 |
| Bottom | — | — | — | — | — | — |
| Average | 9.3 | 7.3 | 9.5 | 7.7 | 11.0 | 8.7 |
| System Voltage | 115 | 90.4 | 115 | 92.7 | 115 | 91.1 |
| Stack Voltage Drop at 8 minutes | | | | | | |
| Top | 41.1 | 32.3 | 43.5 | 35.1 | 46.5 | 36.8 |
| Middle | 36.5 | 28.7 | 38.2 | 30.8 | 41.7 | 33.0 |
| Bottom | — | — | — | — | — | — |
| Average | 38.8 | 30.5 | 40.9 | 32.9 | 44.1 | 34.9 |
| Stack + Electrode Voltage Drop | 110.7 | 87.0 | 110.0 | 88.6 | 109.9 | 87.0 |
| System Voltage at 8 minutes | 115 | 90.4 | 116 | 93.5 | 116 | 91.9 |

The resistivities of the expanded conductive mesh anode and cathode, when compared to their flat plate counterparts, were lower by at least 96% and 67%, respectively.

The variations in stack resistivities between the top and middle are substantially reduced with the expanded conductive mesh electrodes. The variations in stack resistivities for the expanded conductive mesh electrodes were 0.3, 0.3 and 0.1 Ω for their respective flow rates. In contrast, the variations in stack resistivities for the flat plate electrodes were 3.6, 4.8 and 3.8 Ω for their respective flow rates. The higher variation in stack resistivity for flat plate electrodes represents an increase of 12–38 times the corresponding variation for expanded conductive mesh electrodes.

Use of the expanded conductive mesh electrodes also significantly reduced the amount of power required to supply the unit. With expanded conductive mesh electrodes, the system voltage necessary to achieve a system current of 1 Amp were 40.4, 42.8 and 48.0 V for the respective flow rates. In contrast, the system voltage for flat plate electrodes were 90.4, 93.5 and 91.9 V for their respective flow rates. Moreover, the power required to supply the EDI unit was about two times greater than that required for expanded conductive mesh electrodes.

Example 5

The effectiveness of the electrodeionization apparatus of the present invention was evaluated with respect to a conventional electrodeionization apparatus using flat plate electrodes. 100–108 µS/cm electrode water was fed parallel and upwardly to the electrode chambers at 0.36, 0.5 and 0.66 lpm. Results for the expanded conductive mesh and flat plate electrodes are reported in Table 9 and Table 10, respectively.

TABLE 9

| | Expanded Conductive Mesh, Parallel and Upflow | | | | | |
|---|---|---|---|---|---|---|
| Electrode Configuration Electrode Flowrate | 0.36 lpm (5.7 gph) 13.6 | | 0.5 lpm (7.9 gph) 19.8 | | 0.66 lpm (10.5 gph) 12.8 | |
| Stack Temp (° C.) | Actual | Corrected | Actual | Corrected | Actual | Corrected |
| Anode Voltage Drop at 10 minutes | | | | | | |
| Top | 1.39 | 1.07 | 1.40 | 1.25 | 1.38 | 1.04 |
| Middle | 1.22 | 0.94 | 1.21 | 1.08 | 1.20 | 0.91 |
| Bottom | 1.18 | 0.91 | 1.18 | 1.06 | 1.17 | 0.88 |
| Average | 1.26 | 0.98 | 1.26 | 1.13 | 1.25 | 0.95 |
| Cathode Voltage Drop at 10 minutes | | | | | | |
| Top | 2.93 | 2.26 | 2.91 | 2.61 | 2.91 | 2.20 |
| Middle | 3.06 | 2.36 | 3.10 | 2.78 | 3.08 | 2.33 |
| Bottom | 3.18 | 2.45 | 3.14 | 2.81 | 3.12 | 2.36 |
| Average | 3.06 | 2.36 | 3.05 | 2.73 | 3.04 | 2.30 |
| System Voltage | 51.0 | 39.4 | 50.0 | 44.8 | 49.0 | 37.0 |
| Stack Voltage Drop at 8 minutes | | | | | | |
| Top | 46.1 | 35.6 | 46.0 | 41.2 | 43.4 | 32.8 |
| Middle | 45.8 | 35.4 | 45.7 | 40.9 | 43.2 | 32.7 |
| Bottom | 45.8 | 35.4 | 45.6 | 40.9 | 43.1 | 32.6 |
| Average | 45.9 | 35.4 | 45.8 | 41.0 | 43.2 | 32.7 |
| Stack + Electrode Voltage Drop | 50.2 | 38.8 | 50.1 | 44.9 | 47.5 | 35.9 |
| System Voltage at 8 minutes | 51 | 39.4 | 51 | 45.7 | 49 | 37.0 |

As seen in Table 9, for expanded conductive mesh electrodes, the anode voltage drop for electrode flow rates of 0.36, 0.5 and 0.66 lpm averaged 0.98, 1.13 and 0.95 V, respectively. The cathode voltage drop for electrode flow rates of 0.36, 0.5 and 0.66 lpm averaged 2.36, 2.73 and 2.30 V and the stack voltage drop averaged 35.4, 41.0 and 32.7 V, respectively. It is noted that at a system current of 1 Amp, the aforementioned voltage drops equaled the resistivities. The variation in anode voltage drops within the top, middle and bottom was 0.16, 0.19 and 0.16 V for flow rates of 0.36, 0.5 and 0.66 lpm, respectively. The variation in cathode voltage drops within the top, middle and bottom was 0.19, 0.20 and 1.6 V for flow rates of 0.36, 0.5 and 0.66 lpm, respectively and the variation in stack voltage drops was 0.2, 0.3 and 0.2 V, respectively.

in anode voltage drops within the top, middle and bottom was 0.62, 0.56 and 0.49 V for flow rates of 0.36, 0.5 and 0.66 lpm, respectively. The variation in cathode voltage drops within the top, middle and bottom was 1.22, 0.96 and 0.69 V for flow rates of 0.36, 0.5 and 0.66 lpm, respectively and the variation in stack voltage drops was 1.9, 1.7 and 1.2 V, respectively.

Voltage drops were also significantly reduced by use of the expanded conductive mesh electrodes. Substituting the expanded conductive electrodes for the flat plate electrodes reduced the voltage drop at the anode an average of 68% and, at the cathode, an average of 48%.

TABLE 10

| | Flat Plate, Parallel and Upflow | | | | | |
|---|---|---|---|---|---|---|
| Electrode Configuration | 0.36 lpm (5.7 gph) | | 0.5 lpm (7.9 gph) | | 0.66 lpm (10.5 gph) | |
| Electrode Flowrate | 16.0 | | 16.4 | | 14.5 | |
| Stack Temp (° C.) | Actual | Corrected | Actual | Corrected | Actual | Corrected |
| Anode Voltage Drop at 10 minutes | | | | | | |
| Top | 3.75 | 3.08 | 3.63 | 3.01 | 3.44 | 2.72 |
| Middle | 4.51 | 3.70 | 4.31 | 3.57 | 4.06 | 3.21 |
| Bottom | 4.40 | 3.61 | 4.04 | 3.35 | 4.04 | 3.19 |
| Average | 4.22 | 3.46 | 3.99 | 3.31 | 3.85 | 3.04 |
| Cathode Voltage Drop at 10 minutes | | | | | | |
| Top | 5.40 | 4.43 | 5.32 | 4.40 | 5.10 | 4.03 |
| Middle | 6.89 | 5.65 | 6.47 | 5.36 | 5.97 | 4.72 |
| Bottom | — | — | — | — | — | — |
| Average | 6.15 | 5.04 | 5.90 | 4.88 | 5.54 | 4.37 |
| System Voltage | 50 | 41.0 | 50 | 41.4 | 47 | 37.1 |
| Stack Voltage Drop at 8 minutes | | | | | | |
| Top | 40.0 | 32.8 | 40.4 | 33.5 | 37.8 | 29.9 |
| Middle | 37.7 | 30.9 | 38.4 | 31.8 | 36.3 | 28.7 |
| Bottom | — | — | — | 5— | — | — |
| Average | 38.9 | 31.9 | 39.4 | 32.6 | 37.1 | 29.3 |
| Stack + Electrode Voltage Drop | 49.2 | 40.4 | 49.3 | 40.8 | 46.4 | 36.7 |
| System Voltage at 8 minutes | 50 | 41.0 | 50 | 41.4 | 48 | 37.9 |

As seen in Table 10, for flat plate electrodes, the anode voltage drop for electrode flow rates of 0.36, 0.5 and 0.66 lpm averaged 3.46, 3.31 and 3.04 V, respectively. The cathode voltage drop for electrode flow rates of 0.36, 0.5 and 0.66 lpm averaged 5.04, 4.88 and 4.37 V and the stack voltage drop averaged 31.9, 32.6 and 29.3 V, respectively. It is noted that at a system current of 1 Amp, the aforementioned voltage drops equaled the resistivities. The variation Example 6

The effectiveness of the electrodeionization apparatus of the present invention was evaluated with respect to a conventional electrodeionization apparatus using flat plate electrodes. 500–530 µS/cm electrode water was fed parallel and upwardly to the electrode chambers at 0.36, 0.5 and 0.66 lpm. Results for the expanded conductive mesh and flat plate electrodes are reported in Table 11 and Table 12, respectively.

TABLE 11

| Electrode Configuration | Expanded Conductive Mesh, Parallel and Upflow | | | | | |
|---|---|---|---|---|---|---|
| Electrode Flowrate | 0.36 lpm (5.7 gph) | | 0.5 lpm (7.9 gph) | | 0.66 lpm (10.5 gph) | |
| Stack Temp (° C.) | 12.8 | | 12.7 | | 13.0 | |
| | Actual | Corrected | Actual | Corrected | Actual | Corrected |
| Anode Voltage Drop at 10 minutes | | | | | | |
| Top | 1.30 | 0.98 | 1.31 | 0.99 | 1.32 | 1.00 |
| Middle | 1.15 | 0.87 | 1.16 | 0.87 | 1.15 | 0.87 |
| Bottom | — | — | 1.13 | 0.85 | 1.13 | 0.86 |
| Average | 1.23 | 0.93 | 1.20 | 0.90 | 1.20 | 0.91 |
| Cathode Voltage Drop at 10 minutes | | | | | | |
| Top | 2.86 | 2.16 | 2.85 | 2.15 | 2.86 | 2.17 |
| Middle | 3.01 | 2.28 | 3.04 | 2.29 | 3.05 | 2.32 |
| Bottom | 3.04 | 2.30 | 3.07 | 2.31 | 3.10 | 2.36 |
| Average | 2.97 | 2.25 | 2.99 | 2.25 | 3.00 | 2.28 |
| System Voltage | 46.0 | 34.8 | 47.0 | 35.4 | 48.0 | 36.5 |
| Stack Voltage Drop at 8 minutes | | | | | | |
| Top | 41.1 | 31.1 | 41.8 | 31.5 | 43.0 | 32.7 |
| Middle | 40.8 | 30.8 | 41.5 | 31.3 | 42.7 | 32.5 |
| Bottom | 40.8 | 30.8 | 41.5 | 31.3 | 42.7 | 32.5 |
| Average | 40.9 | 30.9 | 41.6 | 31.4 | 42.8 | 32.5 |
| Stack + Electrode Voltage Drop | 45.1 | 34.1 | 45.8 | 34.5 | 47.0 | 35.7 |
| System Voltage at 8 minutes | 45 | 34.0 | 47 | 35.4 | 48 | 36.5 |

As seen in Table 11, for expanded conductive mesh electrodes, the anode voltage drop for electrode flow rates of 0.36, 0.5 and 0.66 lpm averaged 0.93, 0.9 and 0.91 V, respectively. The cathode voltage drop for electrode flow rates of 0.36, 0.5 and 0.66 lpm averaged 2.25, 2.25 and 2.28 V, respectively and the stack voltage drop averaged 30.9, 31.4 and 32.5 V. It is noted that at a system current of 1 Amp, the aforementioned voltage drops equaled the resistivities. The variation in anode voltage drops within the top, middle and bottom was 0.11, 0.14 and 0.14 V for flow rates of 0.36, 0.5 and 0.66 lpm, respectively. The variation in cathode voltage drops within the top, middle and bottom was 0.14, 0.16 and 0.19 V for flow rates of 0.36, 0.5 and 0.66 lpm and the variation in stack voltage drops was 0.3, 0.2 and 0.2 V, respectively.

TABLE 12

| Electrode Configuration | Flat Plate, Parallel and Upflow | | | | | |
|---|---|---|---|---|---|---|
| Electrode Flowrate | 0.36 lpm (5.7 gph) | | 0.5 lpm (7.9 gph) | | 0.66 lpm (10.5 gph) | |
| Stack Temp (° C.) | 13.9 | | 13.5 | | 13.4 | |
| | Actual | Corrected | Actual | Corrected | Actual | Corrected |
| Anode Voltage Drop at 10 minutes | | | | | | |
| Top | 2.05 | 1.59 | 2.10 | 1.62 | 2.14 | 1.64 |
| Middle | 2.00 | 1.56 | 2.00 | 1.54 | 1.92 | 1.47 |
| Bottom | 1.86 | 1.45 | 1.91 | 1.47 | 1.99 | 1.53 |
| Average | 1.97 | 1.53 | 2.00 | 1.54 | 2.02 | 1.55 |
| Cathode Voltage Drop at 10 minutes | | | | | | |
| Top | 3.51 | 2.73 | 3.50 | 2.70 | 3.45 | 2.65 |
| Middle | 3.84 | 2.99 | 3.74 | 2.88 | 3.63 | 2.79 |
| Bottom | — | — | — | — | — | — |
| Average | 3.68 | 2.86 | 3.62 | 2.79 | 3.54 | 2.72 |
| System Voltage | 46 | 35.8 | 48 | 37.0 | 50 | 38.4 |
| Stack Voltage Drop at 8 minutes | | | | | | |
| Top | 40.1 | 31.2 | 41.2 | 31.7 | 43.7 | 33.6 |
| Middle | 39.9 | 31.0 | 41.0 | 31.6 | 43.7 | 33.6 |
| Bottom | — | — | — | — | — | — |

TABLE 12-continued

| Electrode Configuration | Flat Plate, Parallel and Upflow | | | | | |
|---|---|---|---|---|---|---|
| Electrode Flowrate<br>Stack Temp (° C.) | 0.36 lpm (5.7 gph)<br>13.9 | | 0.5 lpm (7.9 gph)<br>13.5 | | 0.66 lpm (10.5 gph)<br>13.4 | |
| | Actual | Corrected | Actual | Corrected | Actual | Corrected |
| Average | 40.0 | 31.1 | 41.1 | 31.6 | 43.7 | 33.6 |
| Stack + Electrode Voltage Drop | 45.6 | 35.5 | 46.7 | 36.0 | 49.3 | 37.8 |
| System Voltage at 8 minutes | 47 | 36.6 | 48 | 37.0 | 51 | 39.2 |

As shown in Table 12, for flat plate electrodes, the anode voltage drop for electrode flow rates of 0.36, 0.5 and 0.66 lpm averaged 1.53, 1.54 and 1.55 V, respectively. The cathode voltage drop at 10 minutes for electrode flow rates of 0.36, 0.5 and 0.66 lpm averaged 2.86, 2.79 and 2.72 V and the stack voltage drop averaged 31.1, 31.6 and 33.6 V, respectively. It is noted that at a system current of 1 Amp, the aforementioned voltage drops equaled the resistivities. The variation in anode voltage drops within the top, middle and bottom was 0.14, 0.15 and 0.17 V for flow rates of 0.36, 0.5 and 0.66 lpm, respectively. The variation in cathode voltage drops within the top, middle and bottom was 0.26, 0.18 and 0.14 V for flow rates of 0.36, 0.5 and 0.66 lpm and the variation in stack voltage drops was 0.2, 0.1 and 0 V, respectively.

Voltage drops were also significantly reduced by use of the expanded conductive mesh electrodes. Substituting the expanded conductive electrodes for the flat plate electrodes reduced the voltage drop at the anode an average of 41% and, at the cathode, an average of 19%.

Example 7

The effectiveness of the electrodeionization apparatus of the present invention was evaluated with respect to a conventional electrodeionization apparatus using flat plate electrodes. 500–530 μS/cm electrode water was fed parallel and downwardly to the electrode chambers at 0.36, 0.5 and 0.66 lpm. Results for the expanded conductive mesh and flat plate electrodes are reported in Table 13 and Table 14, respectively.

TABLE 13

| Electrode Configuration | Expanded Conductive Mesh, Parallel and Downflow | | | | | |
|---|---|---|---|---|---|---|
| Electrode Flowrate<br>Stack Temp (° C.) | 0.36 lpm (5.7 gph)<br>12.2 | | 0.5 lpm (7.9 gph)<br>14.0 | | 0.66 lpm (10.5 gph)<br>12.3 | |
| | Actual | Corrected | Actual | Corrected | Actual | Corrected |
| Anode Voltage Drop at 10 minutes | | | | | | |
| Top | 1.35 | 1.00 | 1.47 | 1.15 | 1.38 | 1.03 |
| Middle | 1.21 | 0.90 | 1.41 | 1.10 | 1.26 | 0.94 |
| Bottom | 1.10 | 0.82 | 1.36 | 1.06 | 1.15 | 0.86 |
| Average | 1.22 | 0.91 | 1.41 | 1.10 | 1.26 | 0.94 |
| Cathode Voltage Drop at 10 minutes | | | | | | |
| Top | 3.02 | 2.25 | 3.23 | 2.52 | 3.07 | 2.29 |
| Middle | 3.06 | 2.28 | 3.19 | 2.49 | 3.07 | 2.29 |
| Bottom | 3.03 | 2.25 | 2.95 | 2.30 | 3.00 | 2.24 |
| Average | 3.04 | 2.26 | 3.12 | 2.44 | 3.05 | 2.27 |
| System Voltage | 48.0 | 35.7 | 54.0 | 42.1 | 50.0 | 37.3 |
| Stack Voltage Drop at 8 minutes | | | | | | |
| Top | 42.2 | 31.4 | 48.4 | 37.8 | 45.4 | 33.9 |
| Middle | 42.0 | 31.2 | 4.84 | 37.8 | 45.4 | 33.9 |
| Bottom | 42.1 | 31.3 | 48.5 | 37.8 | 45.4 | 33.9 |
| Average | 42.1 | 31.3 | 48.4 | 37.8 | 45.4 | 33.9 |
| Stack + Electrode Voltage Drop | 46.4 | 34.5 | 53.0 | 41.3 | 49.7 | 37.1 |
| System Voltage at 8 minutes | 48 | 35.7 | 54 | 42.1 | 51 | 38.0 |

As seen in Table 13, for expanded conductive mesh electrodes, the anode voltage drop for electrode flow rates of 0.36, 0.5 and 0.66 lpm averaged 0.91, 1.10 and 0.94 V, respectively. The cathode voltage drop for electrode flow rates of 0.36, 0.5 and 0.66 lpm averaged 2.26, 2.44 and 2.27 V and the stack voltage drop for electrode flow rates of 0.36, 0.5 and 0.66 lpm averaged 31.3, 37.8 and 33.9 V, respectively. It is noted that at a system current of 1 Amp, the aforementioned voltage drops equaled the resistivities. The variation in anode voltage drops within the top, middle and bottom was 0.18, 0.09 and 0.17 V for flow rates of 0.36, 0.5 and 0.66 lpm, respectively. The variation in cathode voltage drops within the top, middle and bottom was 0.3, 0.22 and 0.05 V for flow rates of 0.36, 0.5 and 0.66 lpm, respectively and the variation in stack voltage drops was 0.2, 0 and 0 V, respectively.

V for flow rates of 0.36, 0.5 and 0.66 lpm and the variation in stack voltage drops was 0.4, 0.4 and 0.2 V, respectively.

In this example, the voltage drops were also significantly reduced by use of the expanded conductive mesh electrodes. Substituting the expanded conductive electrodes for the flat plate electrodes reduced the voltage drop at the anode an average of 45% and, at the cathode, an average of 12%.

TABLE 14

| Electrode Configuration | Flat Plate, Parallel and Downflow | | | | | |
|---|---|---|---|---|---|---|
| Electrode Flowrate Stack Temp (° C.) | 0.36 lpm (5.7 gph) 13.2 | | 0.5 lpm (7.9 gph) 13.3 | | 0.66 lpm (10.5 gph) 13.5 | |
| | Actual | Corrected | Actual | Corrected | Actual | Corrected |
| Anode Voltage Drop at 10 minutes | | | | | | |
| Top | 2.24 | 1.71 | 2.16 | 1.65 | 3.18 | 2.45 |
| Middle | 2.01 | 1.54 | 1.99 | 1.52 | 3.03 | 2.33 |
| Bottom | 1.96 | 1.50 | 2.00 | 1.53 | 2.55 | 1.96 |
| Average | 2.07 | 1.58 | 2.05 | 1.57 | 2.92 | 2.25 |
| Cathode Voltage Drop at 10 minutes | | | | | | |
| Top | 3.14 | 2.40 | 3.09 | 2.37 | 3.10 | 2.39 |
| Middle | 3.93 | 3.00 | 3.85 | 2.95 | 3.50 | 2.70 |
| Bottom | — | — | — | — | — | — |
| Average | 3.54 | 2.70 | 3.47 | 2.66 | 3.30 | 2.54 |
| System Voltage | 41 | 31.3 | 41 | 31.4 | 42 | 32.3 |
| Stack Voltage Drop at 8 minutes | | | | | | |
| Top | 33.7 | 25.7 | 34.3 | 26.3 | 35.3 | 27.2 |
| Middle | 33.1 | 25.3 | 33.8 | 25.9 | 35.1 | 27.0 |
| Bottom | — | — | — | — | — | — |
| Average | 33.4 | 25.5 | 34.1 | 26.1 | 35.2 | 27.1 |
| Stack + Electrode Voltage Drop | 39.0 | 29.8 | 39.6 | 30.3 | 41.4 | 31.9 |
| System Voltage at 8 minutes | 41 | 31.3 | 41 | 31.4 | 42 | 32.3 |

As seen in Table 14, for flat plate electrodes, the anode voltage drop for electrode flow rates of 0.36, 0.5 and 0.66 lpm averaged 1.58, 1.57 and 2.25 V, respectively. The cathode voltage drop for electrode flow rates of 0.36, 0.5 and 0.66 lpm averaged 2.70, 2.66, and 2.54 V and the stack voltage drop averaged 25.5, 26.1 and 27.1 V, respectively. It is noted that at a system current of 1 Amp, the aforementioned voltage drops equaled the resistivities. The variation in anode voltage drops within the top, middle and bottom was 0.21, 0.13 and 0.49 V for flow rates of 0.36, 0.5 and 0.66 lpm, respectively. The variation in cathode voltage drops within the top, middle and bottom was 0.60, 0.58 and 0.31

Example 8

The effectiveness of the electrodeionization apparatus of the present invention was evaluated with respect to a conventional electrodeionization apparatus using flat plate electrodes. 500–530 μS/cm electrode water was fed series and upwardly to the electrode chambers at 0.36, 0.5 and 0.66 lpm. Results for the expanded conductive mesh and flat plate electrodes are reported in Table 15 and Table 16, respectively.

TABLE 15

| Electrode Configuration | Expanded Conductive Mesh, Series and Upflow | | | | | |
|---|---|---|---|---|---|---|
| Electrode Flowrate Stack Temp (° C.) | 0.36 lpm (5.7 gph) 12.7 | | 0.5 lpm (7.9 gph) 12.5 | | 0.66 lpm (10.5 gph) 13.5 | |
| | Actual | Corrected | Actual | Corrected | Actual | Corrected |
| Anode Voltage Drop at 10 minutes | | | | | | |
| Top | 1.28 | 0.97 | 1.28 | 0.96 | 1.40 | 1.08 |
| Middle | 1.18 | 0.89 | 1.18 | 0.89 | 1.34 | 1.03 |
| Bottom | 1.14 | 0.86 | 1.13 | 0.85 | 1.24 | 0.95 |
| Average | 1.20 | 0.90 | 1.20 | 0.90 | 1.33 | 1.02 |

TABLE 15-continued

| Electrode Configuration | Expanded Conductive Mesh, Series and Upflow | | | | | |
|---|---|---|---|---|---|---|
| Electrode Flowrate | 0.36 lpm (5.7 gph) | | 0.5 lpm (7.9 gph) | | 0.66 lpm (10.5 gph) | |
| Stack Temp (° C.) | 12.7 | | 12.5 | | 13.5 | |
| | Actual | Corrected | Actual | Corrected | Actual | Corrected |
| Cathode Voltage Drop at 10 minutes | | | | | | |
| Top | 2.84 | 2.14 | 2.83 | 2.12 | 3.01 | 2.32 |
| Middle | 3.02 | 2.28 | 3.01 | 2.26 | 3.04 | 2.34 |
| Bottom | 3.04 | 2.29 | 3.02 | 2.27 | 2.87 | 2.21 |
| Average | 2.97 | 2.24 | 2.95 | 2.22 | 2.97 | 2.29 |
| System Voltage | 45.0 | 33.9 | 45.0 | 33.8 | 53.0 | 40.8 |
| Stack Voltage Drop at 8 minutes | | | | | | |
| Top | 40.5 | 30.5 | 39.9 | 29.9 | 48.3 | 37.2 |
| Middle | 40.2 | 30.3 | 39.6 | 29.7 | 48.1 | 37.0 |
| Bottom | 40.2 | 30.3 | 39.6 | 29.7 | 48.3 | 37.2 |
| Average | 40.3 | 30.4 | 39.7 | 29.8 | 48.2 | 37.1 |
| Stack + Electrode Voltage Drop | 44.5 | 33.5 | 43.9 | 32.9 | 52.5 | 40.5 |
| System Voltage at 8 minutes | 45 | 33.9 | 45 | 33.8 | 54 | 41.6 |

As seen in Table 15, for expanded conductive mesh electrodes, the anode voltage drop for electrode flow rates of 0.36, 0.5 and 0.66 lpm averaged 0.90, 0.90 and 1.02 V, respectively. The cathode voltage drop for electrode flow rates of 0.36, 0.5 and 0.66 lpm averaged 2.24, 2.22 and 2.29 V, respectively and the stack voltage drop averaged 30.4, 29.8 and 37.1 V. It is noted that at a system current of 1 Amp, the aforementioned voltage drops equaled the resistivities. The variation in anode voltage drops within the top, middle and bottom was 0.11, 0.11 and 0.13 V for flow rates of 0.36, 0.5 and 0.66 lpm, respectively. The variation in cathode voltage drops within the top, middle and bottom was 0.15, 0.15 and 0.13 V for flow rates of 0.36, 0.5 and 0.66 lpm, respectively and the variation in stack voltage drops was 0.2 V for all flow rates.

TABLE 16

| Electrode Configuration | Flat Plate, Series and Upflow | | | | | |
|---|---|---|---|---|---|---|
| Electrode Flowrate | 0.36 lpm (5.7 gph) | | 0.5 lpm (7.9 gph) | | 0.66 lpm (10.5 gph) | |
| Stack Temp (° C.) | 13.8 | | 13.5 | | 13.6 | |
| | Actual | Corrected | Actual | Corrected | Actual | Corrected |
| Anode Voltage Drop at 10 minutes | | | | | | |
| Top | 1.90 | 1.47 | 1.85 | 1.42 | 1.84 | 1.42 |
| Middle | 1.80 | 1.40 | 1.79 | 1.38 | 1.83 | 1.41 |
| Bottom | 1.90 | 1.47 | 1.90 | 1.46 | 1.92 | 1.48 |
| Average | 1.87 | 1.45 | 1.85 | 1.42 | 1.86 | 1.44 |
| Cathode Voltage Drop at 10 minutes | | | | | | |
| Top | 2.78 | 2.16 | 2.77 | 2.13 | 2.78 | 2.15 |
| Middle | 3.06 | 2.37 | 3.08 | 2.37 | 3.10 | 2.39 |
| Bottom | — | — | — | — | — | — |
| Average | 2.92 | 2.27 | 2.93 | 2.25 | 2.94 | 2.27 |
| System Voltage | 44 | 34.1 | 44 | 33.9 | 42 | 32.4 |
| Stack Voltage Drop at 8 minutes | | | | | | |
| Top | 38.4 | 29.8 | 38.3 | 29.5 | 36.3 | 28.0 |
| Middle | 38.1 | 29.6 | 37.8 | 29.1 | 35.8 | 27.6 |
| Bottom | — | — | — | — | — | — |
| Average | 38.3 | 29.7 | 38.1 | 29.3 | 36.1 | 27.8 |
| Stack + Electrode Voltage Drop | 43.0 | 33.4 | 42.8 | 33.0 | 40.9 | 31.5 |
| System Voltage at 8 minutes | 44 | 34.1 | 44 | 33.9 | 42 | 32.4 |

As shown in Table 16, for flat plate electrodes, the anode voltage drop for electrode flow rates of 0.36, 0.5 and 0.66 lpm averaged 1.45, 1.42 and 1.44 V, respectively. The cathode voltage drop for electrode flow rates of 0.36, 0.5 and 0.66 lpm averaged 2.27, 2.25 and 2.27 V and the stack voltage drop averaged 29.7, 29.3 and 27.8 V, respectively. It is noted that at a system current of 1 Amp, the aforementioned voltage drops equal the resistivities. The variation in anode voltage drops within the top, middle and bottom was 0.07, 0.08 and 0.07 V for flow rates of 0.36, 0.5 and 0.66 lpm, respectively. The variation in cathode voltage drops within the top, middle and bottom was 0.21, 0.24 and 0.24 V for flow rates of 0.36, 0.5 and 0.66 lpm, respectively and the variation in stack voltage drops was 0.2, 0.4 and 0.4 V, respectively.

Voltage drops were also significantly reduced by use of the expanded conductive mesh electrodes. Substituting the expanded conductive electrodes for the flat plate electrodes reduced the voltage drop at the anode an average of 35%.

Example 9

The influence and performance of an electrode with a spacer such as a screen, was evaluated in a flow visualization cell. In particular, dye tests were conducted with expanded mesh and flat plate electrodes, in combination with a spacer or flow mixer, to evaluate the flow behavior and characteristics of the fluid around the electrodes. The spacers evaluated included two extruded, three woven screens and an inert ion exchange resin material.

The flow characteristics of various configurations of electrode and spacer construction were observed in a flow visualization cell. The flow visualization cell, which was analogous to an electrode chamber, had three single channel endblocks and one endplate with a clear polycarbonate block. Pressure gauges were used to determine the pressure drop. A flow meter was used for flow control. A syringe was used to inject a dye, methylene blue, upstream of the electrode chamber.

Three electrodes were evaluated: (1) a flat plate electrode made of about 0.02 inch thick titanium with about 30 microinch platinum coating; (2) a first expanded mesh electrode made of about 0.035 inch thick titanium with about 30 g/m$^2$ ruthenium oxide coating and having a diamond pattern with a LWD of about 0.5 inch, a SWD of about 0.25 inch, a strand width of about 0.06 inch and a void area of about 0.056 in$^2$; and (3) a second expanded mesh electrode and made of about 0.025 inch thick titanium with iridium oxide coating and having a diamond pattern with a LWD of about 0.25 inch, a SWD of about 0.125 inch, a strand width of about 0.04 inch and a void area of about 0.014 in$^2$.

Table 17 lists the spacers or screens used and their characteristics. MONOSPHERE™ 600 BB resins, available from Dow Chemical Co. (Midland, Mich.) was used as the inert resin.

TABLE 17

| Screen | Catalog Number | Mesh Size (strands/inch) | Thickness (inch) |
|---|---|---|---|
| NALTEX ® LDPE Extruded Mesh[1] | 39.3693 | 11 | 0.028–0.031 |
| Sefar Thick Polypropylene Woven Mesh[2] | 05-1190/42 | 14 | 0.043–0.044 |
| Sefar Thin Polypropylene Woven Mesh[2] | 05-1200/60 | 16 | 0.014–0.015 |
| Cramer Polyester Woven Mesh[3] | M-117/204 | 17 | 0.025–0.027 |

[1]available from NALTEX ® (Austin, Tex.)
[2]available from Sefar America, Inc. (Briarcliff Manor, New York)
[3]available from Cramer Fabrics, Inc. (Spartanburg, South Carolina)

Three different endblocks were used. One endblock was machined with an electrode pocket depth of about 0.06 inch and was used with the flat plate electrode. The second endblock had an electrode pocket depth of about 0.105 inch and was used with the expanded mesh electrodes. The third endblock had an electrode depth of about 0.062 inch and was used with the flat plate electrode and inert resin.

For each test, an endblock was assembled with a spacer and an electrode. For the flat plate electrode configuration, a screen or resin was placed between the endblock and the electrode. Silicone sealant was used to seal the electrode tab. Either resin or a screen was placed in front or behind the expanded mesh electrodes. The screens were also tested in the square or diamond orientation.

An upwardly flow of about 100 ml/min was established within the flow visualization cell. Dye was introduced into the feed stream and the flow pattern was observed for each electrode configuration. A separate test to characterize the movement of gas was performed. This latter test was performed by introducing gas bubbles and fluid into the cell and observing the gas flow behavior.

Tables 18, 19 and 20 summarizes the test conditions, results and observations using the flat plate electrode, the 0.056 in$^2$ and the 0.014 in$^2$ expanded mesh electrodes, respectively.

TABLE 18

| Spacer | Orientation Relative to Flow Direction | Flow Rate (ml/min) | Feed Pressure (psig) | Pressure Drop (psid) | Flow Distribution Characteristics |
|---|---|---|---|---|---|
| NALTEX ® Extruded Mesh[1] | square | 70 | 0.6 | 0.6 | Flow paths were vertically oriented. Not good mixing. Substantial gas hold-up. |
|  |  | 178 | 1.1 | 1.1 |  |
|  | diamond | 94 | 0.6 | 0.6 | Better horizontal mixing. Substantial gas hold-up. |
|  |  | 186 | 1.1 | 1.1 |  |
| Sefar Thick Woven Mesh[2] | square | 110 | 1.25 | 1.25 | Better mixing than extruded mesh. Some minor gas rejection. |

TABLE 18-continued

| Spacer | Orientation Relative to Flow Direction | Flow Rate (ml/min) | Feed Pressure (psig) | Pressure Drop (psid) | Flow Distribution Characteristics |
|---|---|---|---|---|---|
| Cramer Woven Screen[3] | square | 90 | 14 | 2.6 | Good mixing but not as much cross mixing as diamond. No gas rejection. |
| | | 118 | 16.6 | 2.8 | |
| | | 130 | 15 | 3.1 | |
| | diamond | 98 | 13.7 | 2.3 | Best mixing of the flat plate configurations. No gas rejection. Need about 350 ml/min to move gas bubbles. |
| | | 115 | 15.3 | 2.4 | |
| | | 120 | 14.3 | 2.6 | |
| Sefar Thin Woven Mesh[2] | square | 102 | 15.1 | 2.9 | Dye flowed completely horizontally along the mesh pattern with no mixing. No gas rejection. |
| | | 114 | 14.4 | 2.4 | |
| | diamond | 100 | 15.3 | 2.8 | Dye flowed completely horizontally along the mesh pattern with no mixing. No gas rejection. |
| Dow MONOSPHERE ™ 600 BB Resin | — | 116 | 8.4 | 4.9 | Good uniform mixing. Gas rejection not evaluated. |
| | | 130 | 7.4 | 6.5 | |
| | | 146 | 7.4 | 7.4 | |

[1]available from NALTEX ® (Austin, Tex.)
[2]available from Sefar America, Inc. (Briarcliff Manor, New York)
[3]available from Cramer Fabrics, Inc. (Spartanburg, South Carolina)

TABLE 19

| Spacer | Orientation Relative to Flow Direction | Flow Rate (ml/min) | Feed Pressure (psig) | Pressure Drop (psid) | Flow Distribution Characteristics |
|---|---|---|---|---|---|
| NALTEX ® Extruded Screen[1] | diamond | 88 | 13.1 | 2.3 | Good mixing, a laminar profile was observed. Substantial gas hold-up. |
| | | 95 | 14.1 | 2.4 | |
| Sefar Thick Woven Mesh[2] | diamond | 112 | 8 | 1.6 | Laminar flow, excellent mixing observed. |
| | | 650 | 6.2 | 2.7 | |
| Cramer Woven Screen[3] | diamond | 108 | 15 | 2.4 | Excellent mixing observed. Gas rejection was very slow, about 200 ml/min. Needed about 350 ml/min for decent gas rejection. |
| Cramer Woven Screen[3] and Sefar Thin Woven Screen[2] | diamond | 114 | 7.8 | 1.6 | No dye test conducted. (The Cramer Screen was placed between the membrane the electrode and the Sefar Thin Screen was placed behind the electrode.) |
| | | 660 | 6 | 2 | |
| | | 1280 | 5.2 | 3.6 | |
| Dow MONOSPHERE ™ 600 BB | — | 120 | 7.3 | 3.5 | Good uniform mixing. Gas rejection not evaluated. |
| | | 196 | 7 | 5.9 | |
| | | 225 | 6.9 | 6.9 | |

[1]available from NALTEX ® (Austin, Tex.)
[2]available from Sefar America, Inc. (Briarcliff Manor, New York)
[3]available from Cramer Fabrics, Inc. (Spartanburg, South Carolina)

TABLE 20

| Spacer | Orientation Relative to Flow Direction | Flow Rate (ml/min) | Feed Pressure (psig) | Pressure Drop (psid) | Flow Distribution Characteristics |
|---|---|---|---|---|---|
| Cramer Woven Screen[2] and Sefar Thin Woven Screen[1] | diamond | 104 | 2.8 | 0.8 | Excellent mixing. Best gas rejection observed at 100 ml/min. Gas easily rejected at 200 ml/min. (The Cramer Screen was placed behind the |
| | | 104 | 2.2 | 0.8 | |

TABLE 20-continued

| Spacer | Orientation Relative to Flow Direction | Flow Rate (ml/min) | Feed Pressure (psig) | Pressure Drop (psid) | Flow Distribution Characteristics |
|---|---|---|---|---|---|
| | | | | | electrode and the Sefar Thick Screen was placed between the electrode and the membrane.) |

[1]available from Sefar America, Inc. (Briarcliff Manor, New York)
[2]available from Cramer Fabrics, Inc. (Spartanburg, South Carolina)

Channeling, to varying degrees, was observed along the sides the electrode chambers in each of the flat plate test runs. In addition, the runs with the flat plate electrodes using the Naltex Extruded Mesh and the Sefar Thick Woven Mesh were performed without backpressure in the electrode chamber. For the runs in Table 19, a gasket was placed on one side of the electrode chamber and the electrode. Moreover, the electrode and the screen were forced against the other side of the pocket to eliminate or minimize any channeling. Only the resin filled run showed some channeling. For the runs in Table 20, a gasket was placed on one side of the electrode chamber. Similarly, the electrode and the screen were forced against the pocket to eliminate or minimize channeling.

Notably, changing the mesh or screen orientation from square to diamond appeared to improve mixing. It is believed that this latter orientation tended to direct the fluid flow horizontally across the electrode chambers in both the right and left directions whereas the square orientation tended to guide the fluid mostly up the chamber in the vertical direction.

The expanded mesh electrodes appeared to facilitate better mixing and better gas rejection than the flat plat electrodes because, it is believed, the expanded mesh electrodes promoted horizontal mixing. Furthermore, it appeared that using a woven screen spacer facilitated better fluid mixing than an extruded mesh screen because, it is believed, the former tended to force fluid through a structure that had two distinct interwoven strands rather than, as in the latter, a relatively flat mesh structure.

Minimizing the free space within the electrode compartment appeared to promote good mixing around the flat plate electrode. For example, when the Sefar Thin Woven Screen was used with the flat plate electrode, the flow pattern, as indicated by the dye flow, was vertically oriented along the mesh with little or no mixing. In this case, about 40% of the height of the electrode chamber was not filled with either a spacer or electrode material. It also appeared that better results were observed in runs wherein at least 80% of the height of the electrode chamber was occupied.

Only the smaller, 0.014 in$^2$, diamond-shaped expanded mesh electrode with the Sefar Thick Woven Screen and the Cramer Woven Screen appeared to have any gas rejection at lower fluid flow rates. It is believed that the improved gas rejection resulted because of the smaller diamond shape. Finally, it is believed that effective gas rejection or removal required a fluid flow rate of at least about 300 ml/min or, correspondingly, a fluid flow velocity of at least about 44 ft/min, for the flat plate electrodes and at least about 19.8 ft/min for the expanded mesh electrode.

All combinations and permutations of the electroactive media and operational methods are available for practice in various liquid deionization applications as the need arises. For example, the electrodeionization apparatus and method of the present invention can be applied to processes that are presently not practically feasible due to lack of scaling and fouling resistance, temperature resistance, chemical resistance or electrical efficiency. Typical applications would be the purification and softening of relatively untreated municipal water, relatively untreated well water and brackish water and water containing foulants such as polyelectrolytes, tannin, lignin, fulvic acid and other polar or weakly ionized or large ionized organic compounds, foulants such as iron, sulfide, phosphates, silicates and other multivalent ions. Other applications would be in the treatment and processing of, for example, foods and beverages, sugars and various sugar fractionations and chemical modifications, starches, milk and milk by-products, by-products from cheese manufacture such as whey, purification and fractionation of proteins, products of various fermentation processes such as alcoholic beverages, pharmaceutical products and the like, processes in the chemical, pharmaceutical, food and beverage industries requiring ion substitutions in the presence of foulants and chemical oxidants, mixed solutes in low-level radioactive waste streams, waste water streams containing heavy metals and organic compounds and liquids in industries where operation at elevated temperatures are required, or where sterilization or sanitization by heat or chemical oxidants is required.

Further modifications and equivalents of the invention herein disclosed will occur to persons skilled in the art using no more than routine experimentation and all such modifications and equivalents are believed to be within the spirit and scope of the invention as defined by the following claims.

What is claimed is:

1. An electrodeionization apparatus, comprising:
   an electrode formed from an expanded mesh;
   an ion-concentrating compartment; and
   an ion-depleting compartment, wherein the electrode is in contact with an ion-permeable membrane.

2. The electrodeionization apparatus of claim 1, wherein the at least one electrode is an anode.

3. The electrodeionization apparatus of claim 1, wherein the at least one electrode is a cathode.

4. The electrodeionization apparatus of claim 3, wherein the expanded mesh is any metal that is dimensionally stable.

5. The electrodeionization apparatus of claim 4, wherein the expanded mesh is selected from the group consisting of titanium, niobium, tantalum and vanadium.

6. The electrodeionization apparatus of claim 5, wherein the metal is titanium.

7. The electrodeionization apparatus of claim 4, wherein the metal is coated with a conductive coating.

8. The electrodeionization apparatus of claim 7, wherein the conductive coating is selected from the group consisting of platinum, ruthenium oxide, iridium oxide, rhodium oxide and gold.

9. The electrodeionization apparatus of claim 8, wherein the conductive coating is platinum.

10. The electrodeionization apparatus of claim 2, wherein the expanded mesh is selected from the group consisting of a conductive polymer, a conductive ceramic and a metal.

11. The electrodeionization apparatus of claim 3, wherein the expanded mesh is formed from any metal that is dimensionally stable.

12. The electrodeionization apparatus of claim 11, wherein the metal is stainless steel.

13. The electrodeionization apparatus of claim 11, wherein the metal is selected from the group consisting of titanium, niobium, tantalum and vanadium.

14. The electrodeionization apparatus of claim 13, wherein the metal is titanium.

15. The electrodeionization apparatus of claim 11, wherein the metal is coated with a conductive coating.

16. The electrodeionization apparatus of claim 15, wherein the conductive coating is selected from the group consisting of platinum, ruthenium oxide, iridium oxide, rhodium oxide and gold.

17. The electrodeionization apparatus of claim 16, wherein the conductive coating is platinum.

18. The electrodeionization apparatus of claim 1, wherein the expanded mesh comprises a diamond pattern.

19. The electrodeionization apparatus of claim 18, wherein the diamond pattern has an LWD:SWD ratio of about 0.5:1 to about 4:1, wherein LWD is a long way dimension and SWE is a short way dimension.

20. The electrodeionization apparatus of claim 19, wherein the diamond pattern has a LWD:SWD ratio of about 2:1.

21. The electrodeionization apparatus of claim 19, wherein the LWD ranges from about 0.1 inch to about 1 inch.

22. The electrodeionization apparatus of claim 21, wherein the LWD ranges from about 0.25 inch to about 0.5 inch.

23. The electrodeionization apparatus of claim 22, wherein the LWD is about 0.4 inch.

24. The electrodeionization apparatus of claim 1, wherein the ion-permeable membrane comprises a perfluorosulfonic acid.

25. The electrodeionization apparatus of claim 1, wherein the ion-permeable membrane comprises a copolymer of polytetrafluoroethylene and a perfluorosulfonic acid.

26. The electrodeionization apparatus of claim 1, wherein at least a portion of the electrode is positioned away from the ion-permeable membrane by a spacer.

27. The electrodeionization apparatus of claim 26, wherein the spacer is formed from a woven screen.

28. The electrodeionization apparatus of claim 26, wherein the spacer is formed from an inert material.

29. The electrodeionization apparatus of claim 1, further comprising a spacer in contact with the electrode.

30. The electrodeionization apparatus of claim 29, wherein the spacer is formed from a woven screen.

31. The electrodeionization apparatus of claim 30, wherein the woven screen is less than about 0.1 inch thick.

32. The electrodeionization apparatus of claim 31, wherein the spacer is formed from an inert material.

33. The electrodeionization apparatus of claim 1, further comprising a flow mixer in contact with at least a portion of the electrode.

34. The electrodeionization apparatus of claim 33, wherein the flow mixer is any of an inert resin, a woven screen, a fabric or an extruded mesh.

35. An electrodeionization apparatus comprising:
an electrode and an ion-permeable membrane comprising a perfluorosulfonic acid and positioned adjacent the electrode;
an ion-concentrating compartment; and
an ion-depleting compartment, wherein the electrode is formed from an expanded mesh.

36. An electrodeionization apparatus comprising:
an electrode;
an ion-permeable membrane comprising a copolymer of polytetrafluoroethylene and perfluorosulfonic acid and positioned adjacent the electrode;
an ion-concentrating compartment; and
an ion-depleting compartment,
wherein the electrode is formed from an expanded mesh.

37. An electrodeionization apparatus comprising:
an expanded mesh electrode positioned between at least two spacers disposed in an electrode compartment;
an ion-concentrating compartment; and
an ion-depleting compartment.

38. The electrodeionization apparatus of claim 37, wherein the spacer has a diamond pattern.

39. The electrodeionization apparatus of claims 37, wherein the spacer has a square pattern.

40. The electrodeionization apparatus of claim 37, wherein at least one spacer is less than about 0.1 inch thick.

41. The electrodeionization apparatus of claim 37, wherein at least one spacer is formed from a woven screen.

42. The electrodeionization apparatus of claim 37, wherein at least one spacer is formed from an extruded mesh.

43. The electrodeionization apparatus of claim 37, further comprising an ion-permeable membrane positioned adjacent at least one spacer.

44. The electrodeionization apparatus of claim 37, further comprising an endblock in contact with at least one portion of at least one spacer.

45. An electrodeionization apparatus comprising:
at least one electrode formed from an expanded metal mesh wherein a first surface of the electrode is in contact with an ion-permeable membrane and an opposing surface of the electrode is in contact with an endblock.

46. The electrodeionization apparatus of claim 45, wherein the at least one electrode is an anode.

47. The electrodeionization apparatus of claim 46, wherein the expanded metal mesh is formed from any metal that is dimensionally stable.

48. The electrodeionization apparatus of claim 47, wherein the metal is selected from the group consisting of titanium, niobium, tantalum and vanadium.

49. The electrodeionization apparatus of claim 48, wherein the metal is titanium.

50. The electrodeionization apparatus of claim 45, wherein the at least one electrode is a cathode.

51. The electrodeionization apparatus of claim 45, wherein the expanded metal mesh is coated with a conductive coating.

52. The electrodeionization apparatus of claim 51, wherein the conductive coating is selected from the group consisting of platinum, ruthenium oxide, iridium oxide, rhodium oxide and gold.

53. The electrodeionization apparatus of claim 52, wherein the conductive coating is platinum.

54. The electrodeionization apparatus of claim 45, wherein the expanded metal mesh is formed from any metal that is dimensionally stable.

55. The electrodeionization apparatus of claim 54, wherein the expanded metal mesh is stainless steel.

56. The electrodeionization apparatus of claim 54, wherein the expanded metal mesh is selected from the group consisting of titanium, niobium, tantalum and vanadium.

57. The electrodeionization apparatus of claim 56, wherein the expanded metal mesh is titanium.

58. The electrodeionization apparatus of claim 56, wherein the expanded metal mesh is coated with a conductive coating.

59. The electrodeionization apparatus of claim 58, wherein the conductive coating is selected from the group consisting of platinum, ruthenium oxide, iridium oxide, rhodium oxide and gold.

60. The electrodeionization apparatus of claim 59, wherein the conductive coating is platinum.

61. The electrodeionization apparatus of claim 45, wherein the expanded metal mesh has a diamond pattern.

62. The electrodeionization apparatus of claim 61, wherein the diamond pattern has an LWD:SWD ratio of about 0.5:1 to about 4:1, wherein LWD is a long way dimension and SWD is a short way dimension of the diamond pattern.

63. The electrodeionization apparatus of claim 62, wherein the diamond pattern has a LWD:SWD ratio of about 2:1.

64. The electrodeionization apparatus of claim 62, wherein the LWD ranges from about 0.1 inch to about 1 inch.

65. The electrodeionization apparatus of claim 64, wherein the LWD ranges from about 0.25 inch to about 0.5 inch.

66. The electrodeionization apparatus of claim 65, wherein the LWD is about 0.4 inch.

67. The electrodeionization apparatus of claim 45, wherein the electrode is in contact with an inner surface of the endblock.

68. The electrodeionization apparatus of claim 67, wherein the inner surface comprises at least one flow channel.

69. The electrodeionization apparatus of claim 45, wherein the ion-permeable membrane comprises a perfluorosulfonic acid.

70. The electrodeionization apparatus of claim 45, wherein the ion-permeable membrane comprises a copolymer of polytetrafluoroethylene and perfluorosulfonic acid.

71. The electrodeionization apparatus of claim 45, wherein at least a portion of the electrode is positioned away from the ion-permeable membrane by a spacer.

72. The electrodeionization apparatus of claim 71, wherein the spacer is formed from a woven screen.

73. The electrodeionization apparatus of claim 71, wherein the spacer is formed from an inert material.

74. The electrodeionization apparatus of claim 45, wherein the electrode is in contact with a spacer.

75. The electrodeionization apparatus of claim 74, wherein the spacer is formed from a woven screen.

76. The electrodeionization apparatus of claim 75, wherein the woven screen is less than about 0.1 inch thick.

77. The electrodeionization apparatus of claim 45, further comprising a flow mixer in contact with at least a portion of the electrode.

78. An electrodeionization apparatus comprising:
an ion-depleting compartment;
an anolyte compartment comprising an expanded titanium mesh anode in contact with an ion-permeable membrane; and
a catholyte compartment.

79. The electrodeionization apparatus of claim 78, wherein the ion-depleting compartment comprises an ion exchange resin.

80. The electrodeionization apparatus of claim 79, wherein the ion exchange resin comprises anion and cation exchange resin beads having a substantially uniform size.

81. The electrodeionization apparatus of claim 80, wherein the ion exchange resin comprises a mixture of anion exchange resin beads and cation exchange resin beads.

82. The electrodeionization apparatus of claim 80, wherein the ion exchange resin comprises alternating layers of anion exchange resin beads and cation exchange resin beads.

83. The electrodeionization apparatus of claim 82, wherein the layer of anion exchange resin beads comprises at least one dopant material.

84. The electrodeionization apparatus of claim 82, wherein the layer of cation exchange resin beads comprises at least one dopant material.

85. The electrodeionization apparatus of claim 78, wherein the expanded titanium mesh has a diamond pattern.

86. The electrodeionization apparatus of claim 85, wherein the diamond pattern has an LWD:SWD ratio of about 0.5:1 to about 4:1, wherein LWD is a long way dimension and SWD is a short way dimension of the diamond pattern.

87. The electrodeionization apparatus of claim 86, wherein the diamond pattern has a LWD:SWD ratio of about 2:1.

88. The electrodeionization apparatus of claim 86, wherein the LWD ranges from about 0.1 inch to about 1 inch.

89. The electrodeionization apparatus of claim 86, wherein the LWD ranges from about 0.25 inch to about 0.5 inch.

90. The electrodeionization apparatus of claim 89, wherein the LWD is about 0.4 inch.

91. The electrodeionization apparatus of claim 78, wherein the expanded titanium mesh anode is coated with a conductive coating.

92. The electrodeionization apparatus of claim 91, wherein the conductive coating is selected from the group consisting of platinum, ruthenium oxide, iridium oxide, rhodium oxide and gold.

93. The electrodeionization apparatus of claim 92, wherein the conductive coating is platinum.

94. The electrodeionization apparatus of claim 78, further comprising an ion-concentrating compartment.

95. The electrodeionization apparatus of claim 94, wherein the ion-concentrating compartment is free of ion exchange resin.

96. The electrodeionization apparatus of claim 94, wherein the ion-concentrating compartment comprises an ion exchange resin.

97. The electrodeionization apparatus of claim 96, wherein the ion exchange resin comprises anion and cation exchange resin beads having a substantially uniform size.

98. The electrodeionization apparatus of claim 96, wherein the ion exchange resin comprises a mixture of anion exchange resin beads and cation exchange resin beads.

99. The electrodeionization apparatus of claim 96, wherein the ion exchange resin comprises alternating layers of anion exchange resin beads and cation exchange resin beads.

100. The electrodeionization apparatus of claim 78, wherein the catholyte compartment comprises an expanded metal mesh cathode in contact with an ion-permeable membrane.

101. The electrodeionization apparatus of claim 100, wherein the expanded metal mesh cathode is any metal that is dimensionally stable.

102. The electrodeionization apparatus of claim 101, wherein the expanded metal mesh cathode is selected from the group consisting of titanium, niobium, tantalum and vanadium.

103. The electrodeionization apparatus of claim 102, wherein the expanded metal mesh cathode is titanium.

104. The electrodeionization apparatus of claim 103, wherein the expanded metal mesh cathode is coated with a conductive coating.

105. The electrodeionization apparatus of claim 104, wherein the conductive coating is selected from the group consisting of platinum, ruthenium oxide, iridium oxide, rhodium oxide and gold.

106. The electrodeionization apparatus of claim 105, wherein the conductive coating is platinum.

107. The electrodeionization apparatus of claim 100, wherein the ion-permeable membrane comprises a perfluorosulfonic acid.

108. The electrodeionization apparatus of claim 100, wherein the ion-permeable membrane comprises a copolymer of polytetrafluoroethylene and perfluorosulfonic acid.

109. The electrodeionization apparatus of claim 78, wherein the ion-permeable membrane comprises a perfluorosulfonic acid.

110. The electrodeionization apparatus of claim 78, wherein the ion-permeable membrane comprises a copolymer of polytetrafluoroethylene and perfluorosulfonic acid.

111. The electrodeionization apparatus of claim 78, further comprising a spacer in contact with at least a portion of the mesh anode.

112. The electrodeionization apparatus of claim 78, further comprising a flow mixer in contact with at least a portion of the mesh anode.

113. An electrodeionization apparatus comprising:
a plurality of alternating anion and cation permeable membranes defining ion-depleting and ion-concentrating compartments,
an anolyte compartment comprising an expanded metal mesh anode in contact with an anion-permeable membrane, and
a catholyte compartment.

114. The electrodeionization apparatus of claim 113, wherein the ion-concentrating compartment comprises an ion exchange resin.

115. The electrodeionization apparatus of claim 114, wherein the ion exchange resin comprises anion and cation exchange resin beads having a substantially uniform size.

116. The electrodeionization apparatus of claim 115, wherein the ion exchange resin comprises a mixture of anion exchange resin beads and cation exchange resin beads.

117. The electrodeionization apparatus of claim 115, wherein the ion exchange resin comprises alternating layers of anion exchange resin beads and cation exchange resin beads.

118. The electrodeionization apparatus of claim 113, wherein the expanded metal mesh is any metal that is dimensionally stable.

119. The electrodeionization apparatus of claim 118, wherein the metal is selected from the group consisting of titanium, niobium, tantalum and vanadium.

120. The electrodeionization apparatus of claim 119, wherein the metal is titanium.

121. The electrodeionization apparatus of claim 118, wherein the metal is coated with a conductive coating.

122. The electrodeionization apparatus of claim 121, wherein the conductive coating is selected from the group consisting of platinum, ruthenium oxide, iridium oxide, rhodium oxide and gold.

123. The electrodeionization apparatus of claim 122, wherein the conductive coating is platinum.

124. The electrodeionization apparatus of claim 113, wherein the catholyte compartment comprises an expanded metal mesh electrode in contact with an ion-permeable membrane.

125. The electrodeionization apparatus of claim 124, wherein the ion-permeable membrane comprises a perfluorosulfonic acid.

126. The electrodeionization apparatus of claim 124, wherein the ion-permeable membrane comprises a copolymer of polytetrafluoroethylene and perfluorosulfonic acid.

127. The electrodeionization apparatus of claim 124, wherein the expanded metal mesh electrode is in contact with an endblock.

128. The electrodeionization apparatus of claim 127, wherein the catholyte compartment is free of electroactive media.

129. The electrodeionization apparatus of claim 124, wherein the expanded metal mesh electrode is made of stainless steel.

130. The electrodeionization apparatus of claim 113, wherein the expanded metal mesh anode is in contact with an endblock.

131. The electrodeionization apparatus of claim 113, wherein the anolyte compartment is free of electroactive media.

132. The electrodeionization apparatus of claim 131, wherein the expanded metal mesh anode is any metal that is dimensionally stable.

133. The electrodeionization apparatus of claim 132, wherein the metal is selected from the group consisting of titanium, niobium, tantalum and vanadium.

134. The electrodeionization apparatus of claim 133, wherein the metal is titanium.

135. The electrodeionization apparatus of claim 134, wherein the metal is coated with a conductive coating.

136. The electrodeionization apparatus of claim 135, wherein the conductive coating is selected from the group consisting of platinum, ruthenium oxide, iridium oxide, rhodium oxide and gold.

137. The electrodeionization apparatus of claim 136, wherein the conductive coating is platinum.

138. The electrodeionization apparatus of claim 113, wherein the expanded mesh anode has a diamond pattern.

139. The electrodeionization apparatus of claim 138, wherein the diamond pattern has an LWD:SWD ratio of about 0.5:1 to about 4:1, wherein LWD is a long way dimension and SWD is a short way dimension of the diamond pattern.

140. The electrodeionization apparatus of claim 139, wherein the diamond pattern has a LWD:SWD ratio of about 2:1.

141. The electrodeionization apparatus of claim 139, wherein the LWD ranges from about 0.1 inch to about 1 inch.

142. The electrodeionization apparatus of claim 141, wherein the LWD ranges from about 0.25 inch to about 0.5 inch.

143. The electrodeionization apparatus of claim 142, wherein the LWD is about 0.4 inch.

144. The electrodeionization apparatus of claim 113, wherein the ion-permeable membrane comprises a perfluorosulfonic acid.

145. The electrodeionization apparatus of claim 113, further comprising a spacer in contact with at least a portion of the mesh anode.

146. The electrodeionization apparatus of claim 113, further comprising a flow mixer in contact with at least a portion of the mesh anode.

147. An electrodeionization apparatus comprising at least one electrode formed from an expanded metal mesh in contact with an interior surface of an endblock and wherein the interior surface comprises flow channels.

148. The electrodeionization apparatus of claim 147, further comprising a spacer in contact with at least a portion of the electrode.

149. The electrodeionization apparatus of claim 148, wherein the metal is selected from the group consisting of titanium, niobium, tantalum and vanadium.

150. The electrodeionization apparatus of claim 149, wherein the metal is titanium.

151. The electrodeionization apparatus of claim 147, further comprising a flow mixer in contact with at least a portion of the electrode.

152. The electrodeionization apparatus of claim 147, wherein the expanded metal mesh is any metal that is dimensionally stable.

153. The electrodeionization apparatus of claim 147, wherein the metal is coated with a conductive coating.

154. The electrodeionization apparatus of claim 153, wherein the conductive coating is selected from the group consisting of platinum, ruthenium oxide, iridium oxide, rhodium oxide and gold.

155. The electrodeionization apparatus of claim 154, wherein the conductive coating is platinum.

156. An electrodeionization apparatus for purifying a liquid comprising an electrode compartment free of ion exchange resin constructed and arranged to allow purification of a liquid without chemical addition to provide a substantially uniform current density in the compartment.

157. An electrodeionization apparatus comprising:
an electrode formed from a perforated plate positioned adjacent to an ion-permeable membrane;
an ion-concentrating compartment; and
an ion-depleting compartment.

158. An electrodeionization apparatus comprising an electrode positioned adjacent a flow mixer formed from a woven screen and an endblock positioned against the flow mixer.

159. An electrodeionization apparatus comprising:
an ion-concentrating compartment;
an ion-depleting compartment;
an expanded mesh electrode;
a spacer positioned adjacent the mesh electrode; and
an ion-permeable membrane positioned adjacent the mesh electrode at an opposite side from the spacer.

160. The electrodeionization apparatus as in claim 159, further comprising an endblock positioned adjacent the spacer opposite from the mesh electrode.

161. The electrodeionization apparatus as in claim 159, further comprising a second spacer positioned between the mesh electrode and an endblock.

162. An electrodeionization apparatus comprising at least one electrode, formed from an expanded mesh positioned adjacent to an ion-permeable membrane, an ion-concentrating compartment, and an ion-depleting compartment.

163. The electrodeionization apparatus of claim 162, wherein the at least one electrode is an anode.

164. The electrodeionization apparatus of claim 162, wherein the at least one electrode is a cathode.

165. The electrodeionization apparatus of claim 162, wherein the expanded mesh is selected from the group consisting of a conductive polymer, a conductive ceramic and a metal.

166. The electrodeionization apparatus of claim 162, wherein the expanded mesh is formed from any metal that is dimensionally stable.

167. The electrodeionization apparatus of claim 166, wherein the expanded mesh is selected from the group consisting of titanium, niobium, tantalum and vanadium.

168. The electrodeionization apparatus of claim 167, wherein the metal is titanium.

169. The electrodeionization apparatus of claim 166, wherein the metal is coated with a conductive coating.

170. The electrodeionization apparatus of claim 169, wherein the conductive coating is selected from the group consisting of platinum, ruthenium oxide, iridium oxide, rhodium oxide and gold.

171. The electrodeionization apparatus of claim 170, wherein the conductive coating is platinum.

172. The electrodeionization apparatus of claim 166, wherein the metal is stainless steel.

173. The electrodeionization apparatus of claim 162, wherein the expanded mesh electrode has a diamond pattern.

174. The electrodeionization apparatus of claim wherein the diamond pattern has an LWD:SWD ratio of about 0.5:1 to about 4:1, wherein LWD is a long way dimension and SWD is a short way dimension of the diamond pattern.

175. The electrodeionization apparatus of claim 174, wherein the diamond pattern has a LWD:SWD ratio of about 2:1.

176. The electrodeionization apparatus of claim 174, wherein the LWD ranges from about 0.1 inch to about 1 inch.

177. The electrodeionization apparatus of claim 176, wherein the LWD ranges from about 0.25 inch to about 0.5 inch.

178. The electrodeionization apparatus of claim 177, wherein the LWD is about 0.4 inch.

179. The electrodeionization apparatus of claim 162, wherein the ion-permeable membrane comprises a perfluorosulfonic acid.

180. The electrodeionization apparatus of claim 162, wherein the ion-permeable membrane comprises a copolymer of polytetrafluoroethylene and a perfluorosulfonic acid.

181. The electrodeionization apparatus of claim 162, further comprising at least one of a screen, a mesh and a fabric in contact with at least a portion of the electrode.

182. The electrodeionization apparatus of claim 162, further comprising a spacer positioned adjacent the electrode gas hold-up.

* * * * *